United States Patent [19]
Nishimura et al.

[11] Patent Number: 5,982,773
[45] Date of Patent: Nov. 9, 1999

[54] LAN CONNECTION METHOD

[75] Inventors: Takashi Nishimura; Naohide Sekiya; Takeshi Kimura; Hideki Inoue; Hiroshi Nagano; Ikuo Taoka, all of Kawasaki, Japan

[73] Assignee: Fujitsu Limited, Kanagawa, Japan

[21] Appl. No.: 08/822,831

[22] Filed: Mar. 24, 1997

[30] Foreign Application Priority Data

Aug. 30, 1996 [JP] Japan .................................. 8-229673

[51] Int. Cl.⁶ .................................................. H04L 12/28
[52] U.S. Cl. .......................................... 370/395; 370/401
[58] Field of Search ..................................... 370/257, 270, 370/274, 351, 353, 355, 385, 390, 392, 395, 396, 400, 404, 405, 401, 466, 492, 501; 395/200.02; 320/901, 905, 908

[56] References Cited

U.S. PATENT DOCUMENTS

| 5,581,552 | 12/1996 | Civanlar et al. | 370/396 |
| 5,600,644 | 2/1997 | Chang et al. | 370/404 |
| 5,715,250 | 2/1998 | Watanabe | 370/395 |
| 5,732,071 | 3/1998 | Saito et al. | 370/401 |
| 5,737,333 | 4/1998 | Civanlar | 370/352 |
| 5,777,994 | 7/1998 | Takihiro et al. | 370/401 |

Primary Examiner—Chau Nguyen
Assistant Examiner—Chiho Andrew Lee
Attorney, Agent, or Firm—Helfgott & Karas, P.C.

[57] ABSTRACT

A local area network (LAN) connection method runs an existing LAN application in an asynchronous transfer mode (ATM) network to connect LANS. The LAN connection method includes the steps of (a) in a LAN emulation (LANE) protocol which operates an existing network in the ATM network, connecting LAN emulation servers (LESs) which mainly cope with addresses from medial access control (MAC) addresses to ATM addresses in emulated LANs (ELANs) by a virtual channel connection (VCC) for transferring a LAN emulation address resolution protocol (LE ARP) which inquires the ATM address from the MAC address, and (b) transferring a LE ARP request with respect to a LAN emulation client (LEC) in a second ELAN to a LES in the second ELAN when a LES in a first ELAN receives the LE ARP request from a LEC in the first ELAN.

16 Claims, 22 Drawing Sheets

FIG. I PRIOR ART

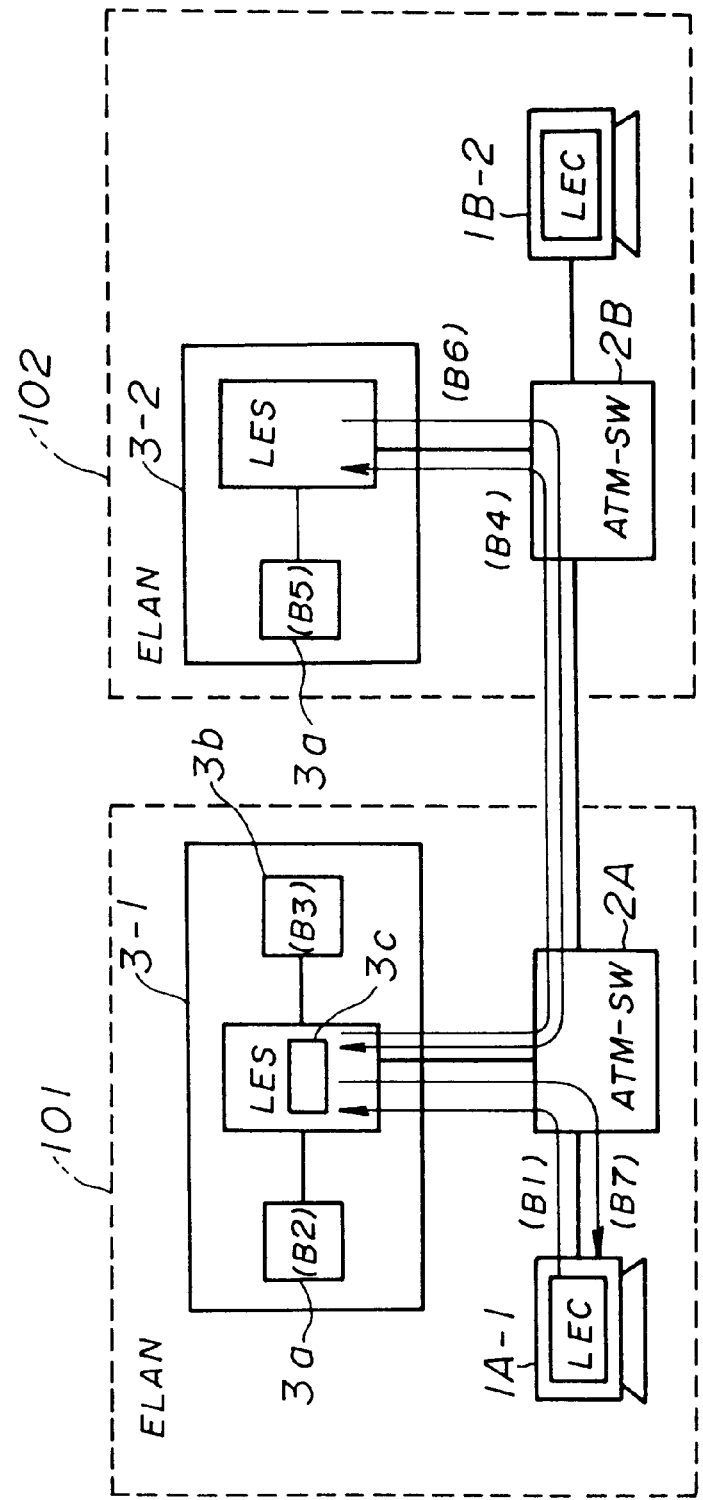

FIG.11A

LEC MANAGEMENT TABLE OF LES 3-1

| MAC ADDRESS | ATM ADDRESS |
|---|---|
| LEC0 xxxx | xxxxx LEC0 |
| LEC1 xxxx | xxxxx LEC1 |

FIG.11B

LEC MANAGEMENT TABLE OF LES 3-2

| MAC ADDRESS | ATM ADDRESS |
|---|---|
| LEC2 xxxx | xxxxx LEC2 |
| LEC3 xxxx | xxxxx LEC3 |

FIG.12

| REQUESTING LEC | | RESPONDING LEC |
|---|---|---|
| MAC ADDRESS | ATM ADDRESS | MAC ADDRESS |
| LEC1 xxxx | xxxxx LEC1 | LEC2 xxxx |

FIG. 17

| NETWORK ADDRESS | ELAN NAME | ATM ADDRESS OF BUS |
|---|---|---|
| IP1 xxxxx | ELAN1 | xxxxx BUS1 |
| IP2 xxxxx | ELAN2 | xxxxx BUS2 |

FIG. 18

| ATM ADDRESS OF LEC | ATM ADDRESS OF BUS | TIME |
|---|---|---|
| xxxxx LEC1 | xxxx BUS 2 | xx SECONDS |
| .. | .. | |

FROM OTHER BUS
⇩
RECEIVE DATA — S41
↓
TRANSFER DATA — S42
⇩
TO ALL LECs

| ATM ADDRESS OF LEC | ATM ADDRESS OF BUF | TIME |
|---|---|---|
| xxxxxLEC1<br>xxxxxLEC1<br>• | xxxxBUS2<br>xxxxBUS1<br>• | λ SECONDS<br>xx SECONDS<br>• |

FIG. 23

| ATM ADDRESS OF LEC | ATM ADDRESS OF BUS | TIME |
|---|---|---|
| xxxxx LEC1<br>xxxxx LEC1<br>xxxxx LEC1 | xxxxx BUS2<br>xxxxx BUS1<br>xxxxx ROUT | $\lambda$ SECONDS<br>xx SECONDS<br>xx SECONDS |

LAN CONNECTION METHOD

BACKGROUND OF THE INVENTION

The present invention generally relates to local area network (LAN) connection methods, and more particularly to a LAN or inter-LAN connection method which runs an existing LAN application in an asynchronous transfer mode (ATM) network and connects LANs.

As a means of structuring a LAN using the ATM technology in a broadband integrated services digital network (B-ISDN), a LAN emulation (LANE) protocol has been announced from the ATM Forum. The LANE inserts a media access control (MAC) protocol of the data link layer between the network layer protocol and the ATM protocol, similarly to the existing LAN such as the ethernet, so as to enable ATM communication without the need to modify the network layer protocol.

In order to run an existing LAN application in the ATM network which is based on a 1:1 (or point-to-point) communication, it is necessary to provide a mechanism to realize a broadcast function and the like which are characteristics of the LAN. The LANE protocol is characterized in that a plurality of connections are combined in the ATM network that provides a connection type communication which makes the communication by connecting subscribers, so as to make it look as if a connectionless type LAN communication were realized.

According to the LANE protocol, the MAC protocol of the data link layer is provided between the network layer protocol and the ATM protocol, similarly to the existing LAN, so that the ATM communication is realized without modifying the network layer protocol. A communication between LAN emulation client (LEC) terminals within an emulated LAN (ELAN) is realized by the following 3 servers, namely, a LAN emulation configuration server (LECS), a LAN emulation server (LES) and a broadcast and unknown server (BUS).

The LECS controls a LAN emulation address resolution protocol (LE ARP) and mainly copes with the address from a MAC address to an ATM address. The LES has a function of linking the individual LEC to a specific ELAN. The BUS transmits traffic with unknown destination, multicast traffic, and broadcast traffic to all the LECs within the segment.

When the end user terminal, that is, the LEC, transmits data, the LEC must known the network layer address (IP address) and the MAC address of the LEC at the other end, similarly as in the case of the conventional LAN. Further, the LEC must also know the ATM address (VPI/VCI) of the LEC at the other end. The LES notifies the ATM address of the LEC at the other end to the LEC, and the LECS notifies the address of the LES.

FIG. 1 generally shows a conventional system including LECs 1A and 1B, an ATM switch 2 connecting the LECs 1A and 1B, a LES 3, a LECS 4, a BUS 5, and a buffer 5d provided within the BUS 5. A connection L1 is made between the LEC 1A and the LECS 4, a connection L2 is made between the LEC 1A and the LES 3, a connection L3 is made between the BUS 5 and the LECs 1A and 1B, and a connection L4 is made between the LEC 1A and the LEC 1B. A connection procedure with respect to the ELAN of the system having the above described construction is as follows.

First, when the power of the LEC 1A is turned ON, the LEC 1A recognizes its own TM address and the ATM address of the LECS 4. The LEC 1A makes the connection L1 between the LEC 1A and the LECS 4, and obtains the ATM address of the LES 3 from the LECS 4. Next, the LEC 1A makes the connection L2 between the LEC 1A and the LES 3, and obtains the ATM address of the BUS 5 from the LES 3. Then, the LEC 1A makes the connection L3 between the LEC 1A and the BUS 5.

Next, a description will be given of the communication procedure. In order to know the ATM address of the LEC 1B at the other end, the LEC 1A issues a LE ARP request with respect to the LES 3 using the connection L2 so as to request notification of the MAC address of the LEC 1B at the other end. The LEC 1A sends the data to be transmitted with respect to the BUS 5 using the connection L3 even while waiting for a response to the LE ARP request from the LES 3. The data to be transmitted are successively stored in the buffer 5a.

Even if the BUS 5 does not know the ATM address of the LEC 1B at the other end, the BUS 5 transfers the data to the LEC 1B at the other end by broadcasting the data within the ELAN. The data transmission is made before the direct connection L4 between the LECs 1A and 1B is acquired, so as to eliminate a delay when acquiring the connection, and to make it look as if a connectionless communication is being made. When the LEC 1A receives the response (the ATM address of the LEC 1B at the other end) to the LE ARP request from the LES 3, the LEC 1A acquires the connection L4 between the LEC 1A and the LEC 1B at the other end. When this connection L4 is acquired, the LEC 1A sends the data directly to the LEC 1B at the other end without going through the BUS 5.

One LES and one BUS are set up in the ELAN, and both the LES and the BUS only manage the ATM address of the LECs in the ELAN to which the LES and the BUS belong. For this reason, according to the conventional LANE protocol, it is only possible to carry out a communication within the LAN. In order to make a communication (inter-LAN communication) between the LECs belonging to different ELANS, it becomes necessary to carry out a routing in the network layer by use of a router or the like.

FIG. 2 generally shows a conventional connection of ELANs. More particularly, FIG. 2 shows a case where a communication is made between LECs of an ELAN 101 and an ELAN 102. In FIG. 2, the LEC 1A, a LES 3-1, an ATM switch 2A and a BUS 5-1 are provided within the ELAN 101. On the other hand, the LEC 1B, a LES 3-2, an ATM switch 2B and a BUS 5-2 are provided within the ELAN 102. A router 6 connects the ELAN 101 and the ELAN 102.

Each of the LECs 1A and 1B is made up of a network layer, a MAC layer, a LANE and an ATM layer, starting from the upper layer. The router 6 is made up of a network layer, a MAC layer, a LANE and an ATM layer, starting from the upper layer.

In the system shown in FIG. 2, the LEC 1A issues a LE ARP request with respect to the LES 3-1 so as to know the ATM address of the LEC 1B at the other end, and attempts to recognize the MAC address of the LEC 1B at the other end. However, since the LES 3-1 does not know the ATM address of the LEC 1B at the other end, the LES 3-1 instead notifies the MAC address of the router 6 to the LEC 1A. During this time, the LEC 1A sends the data with respect to the BUS 5-1. Because the BUS 5-1 does not have a connection with the LEC 1B at the other end, the BUS 5-1 transfer broadcast data to the router 6. Then, the LEC 1A makes a connection between the LEC 1A and the router 6.

On the other hand, the router 6 receives the data from the LEC 1A and stores the received data in an internal buffer thereof. This router 6 transfers the data to the BUS 5-2 in place of the LEC 1A, and transfers the data to the LES 3-2 in place of the LEC 1A. When the router 6 recognizes the ATM address of the LEC 1B at the other end in response to the LE ARP request from the LES 3-2, the router 6 makes a connection between the touter 6 and the LEC 1B. Hence, the LEC 1A and the LEC 1B exchange the data via the router 6.

Therefore, according to the conventional system, it is not possible for make a direct connection (virtual channel connection: VCC) when making the communication between the LECs 1A and 1B in the different ELANs 101 and 102, and a complicated routing process is required by the router 6 in the network layer. As a result, a high-speed communication cannot be realized due to the need to carry out the complicated routing process in the router 6, and there was a problem in that the capabilities of the ATM network cannot be utilized efficiently when making an inter-LAN communication.

SUMMARY OF THE INVENTION

Accordingly, it is a general object of the present invention to provide a novel and useful LAN connection method in which the problem described above is eliminated.

Another and more specific object of the present invention is to provide a LAN connection method which can directly communicate between LECs in different ELANs without the need to use a router.

Still another object of the present invention is to provide a local area network (LAN) connection method which runs an existing LAN application in an asynchronous transfer mode (ATM) network to connect LANs, comprising the steps of (a) in a LAN emulation (LANE) protocol which operates an existing network in the ATM network, connecting LAN emulation servers (LESS) which mainly cope with addresses from medial access control (MAC) addresses to ATM addresses in emulated LANs (ELANS) by a virtual channel connection (VCC) for transferring a LAN emulation address resolution protocol (LE ARP) which inquires the ATM address from the MAC address, and (b) transferring a LE ARP request with respect to a LAN emulation client (LEC) in a second ELAN to a LES in the second ELAN when a LES in a first ELAN receives the LE ARP request from a LEC in the first ELAN. According to the LAN connection method of the present invention, the LES of the first ELAN can notify the ATM address of the LEC in the second ELAN with respect to the LEC in the first ELAN, by simply managing the LEC in the first ELAN.

A further object of the present invention is to provide a local area network (LAN) connection method which runs an existing LAN application in an asynchronous transfer mode (ATM) network to connect LANS, comprising the steps of (a) in a LAN emulation (LANE) protocol which operates an existing network in the ATM network, connecting broadcast and unknown servers (BUSs) which broadcast data from a LAN emulation client (LEC) in an emulated LAN (ELAN) within the ELAN by a virtual channel connection (VCC) for transferring the data between the BUSs, and (b) transferring sending data received by the BUS in a first ELAN to the BUS in a second ELAN when the sending data is with respect to a LEC in the second ELAN and is received from a LEC in the first ELAN. According to the LAN connection method of the present invention, the BUS in the first ELAN can broadcast the data from the LEC in the first ELAN to the second ELAN, by simply connecting the VCC and the LEC in the first ELAN.

Another object of the present invention is to provide a local area network (LAN) connection method which runs an existing LAN application in an asynchronous transfer mode (ATM) network to connect LANs, comprising the steps of (a) managing, in a LAN emulation configuration server (LECS) which has a function of linking a LAN emulation client (LEC) to a specific emulated LAN (ELAN), a corresponding table of a network address of an IP address (network layer address) and an ATM address of each LAN emulation server (LES) which copes with addresses from a media access control (MAC) addresses to ATM addresses, (b) judging from the IP address the LES to which the LEC is to be connected, where the LEC acquires a configuration direct virtual channel connection (VCC) which is an initial setting VCC with respect to the LECS, and (c) notifying the ATM address of the LES to the LEC. According to the LAN connection method of the present invention, since the LECS judges the LES to be connected based on the IP address of the LEC, it is possible to make a communication regardless of the physical position of the LEC.

Other objects and further features of the present invention will be apparent from the following detailed description when read in conjunction with the accompanying drawings.

BRIEF DESCRIPTION OF THE DRAWINGS

FIG. 10 is a diagram for explaining the operation of a LES;

FIGS. 11A and 11B respectively are diagrams for explaining the construction of LEC management tables;

FIG. 12 is a diagram for explaining the construction of a LE ARP response table;

FIG. 17 is a diagram for explaining the construction of an IP address table;

FIG. 18 is a diagram for explaining the construction of an ATM junction table;

FIG. 23 is a diagram for explaining the construction of another ATM junction table of the BUS;

DESCRIPTION OF THE PREFERRED EMBODIMENTS

Figure 3:
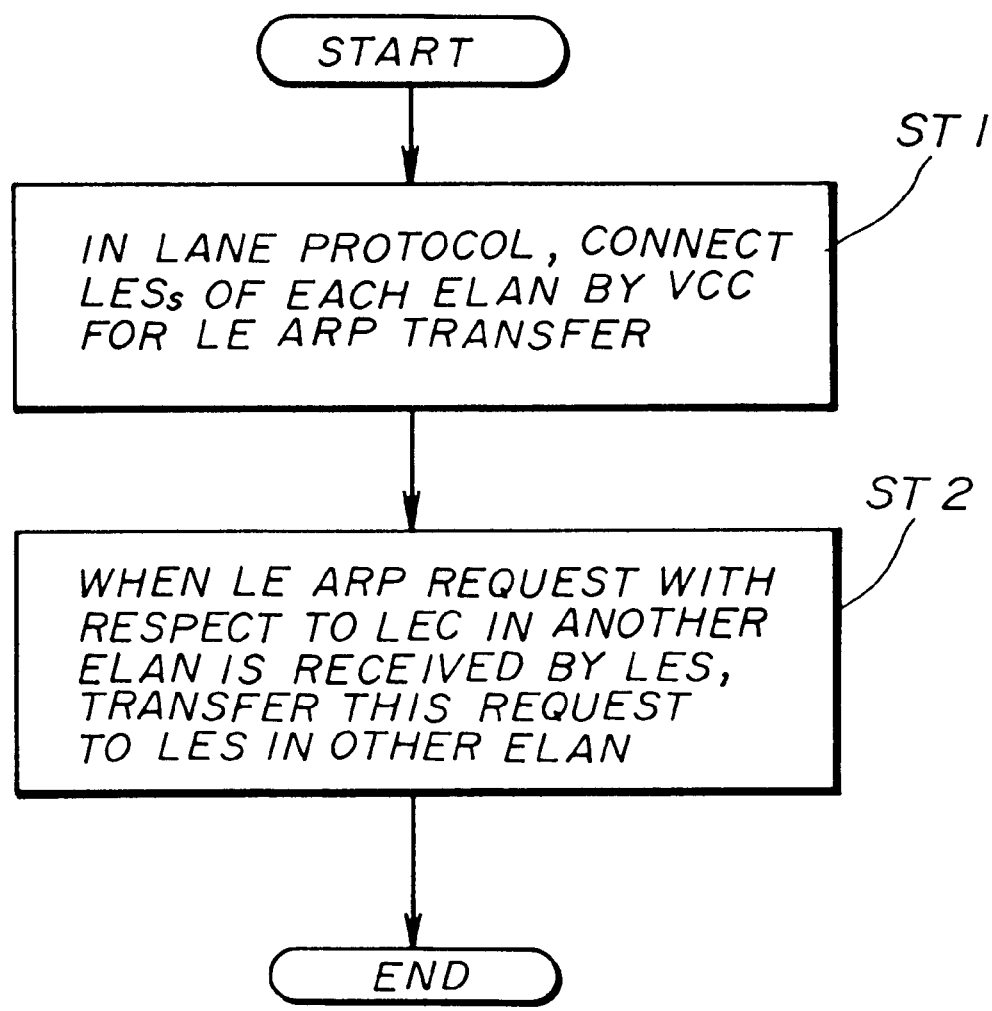
FIG. 3 is a flow chart for explaining a first aspect of the present invention.

A first aspect of the present invention will be described with reference to FIG. 3. FIG. 3 is a flow chart for explaining this first aspect of the present invention.

According to this first aspect of the present invention, a LAN connection method runs an existing LAN application in an ATM network, and includes steps ST1 and ST2 shown in FIG. 3. In a LANE protocol which operates an existing network in the ATM network, the step ST1 connects LESs which mainly cope with the address from a MAC address to an ATM address in ELANs by a VCC for transferring a LE ARP which inquires the ATM address from the MAC address. The step ST2 transfers a LE ARP request with respect to a LEC (end user terminal) in a second ELAN to a LES in the second ELAN when the LES in a first ELAN receives the LE ARP request from a LEC in the first ELAN.

According to this first aspect of the present invention, the LES of the first ELAN can notify the ATM address of the LEC in the second ELAN with respect to the LEC in the first ELAN, by simply managing the LEC in the first ELAN.

The LES in the first ELAN may judge that a LEC belongs to another (second) ELAN if this LEC is not registered in the LEC management table which stores the MAC addresses and the corresponding ATM addresses of all LECs in the first ELAN. In addition, the LES in the first ELAN may register and manage information indicating that a response is waited with respect to the LE ARP request using a LE ARP response table which stores the LEC which issued the request and the corresponding responding LEC which responds.

In this case, it is possible to determine whether or not to transfer the LE ARP request using only the LEC management table of the first ELAN.

In addition, the LES which receives the transferred LE ARP request may refer to the LEC management table of the second ELAN, and return a LE ARP response to the LES at the request transfer source if the responding LEC is registered in the LEC management table of the second ELAN, and further, discard the LE ARP request if the responding LEC is not registered in the LEC management table of the second ELAN.

In this case, the LES which receives the transferred LE ARP request can return the LE ARP response to the other LES which transferred the LE ARP request.

Furthermore, the LES which receives the LE ARP response from another LES may refer to the LE ARP response table of the first ELAN, and transfer the LE ARP response to the LEC which issued the request if this LEC is registered in the LE ARP response table and delete this LEC from the LE ARP response table. On the other hand, the LES which receives the LE ARP response from another LES may discard the LE ARP response if the LEC which issued the request is not registered in the LE ARP response table.

In this case, the LES which receives the LE ARP response from another LES can quickly transfer the LE ARP response to the LEC which issued the request, by using the LE ARP response table.

Figure 4:
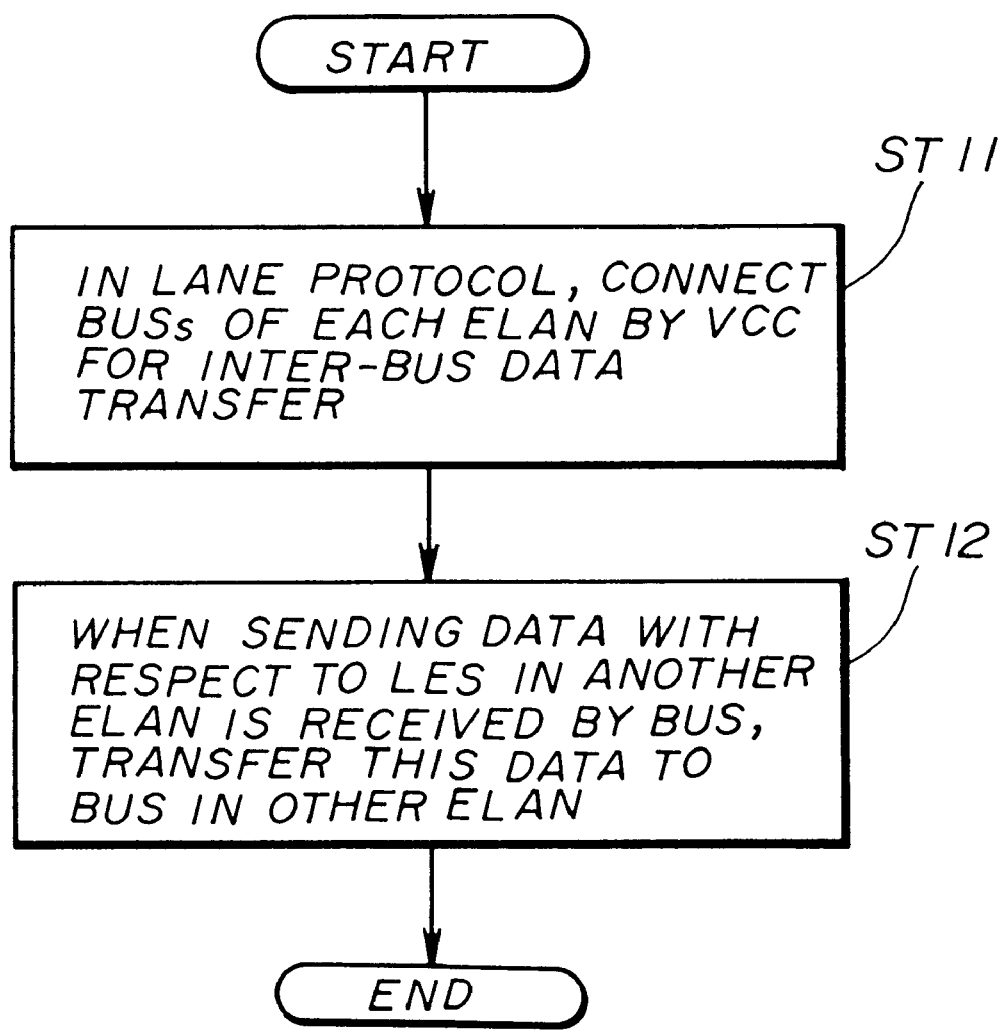
FIG. 4 is a flow chart for explaining a second aspect of the present invention.

A second aspect of the present invention will be described with reference to FIG. 4. FIG. 4 is a flow chart for explaining this second aspect of the present invention.

According to the second aspect of the present invention, a LAN connection method runs an existing LAN application in an ATM network, and includes steps ST11 and ST12 shown in FIG. 4. In a LANE protocol which operates an existing network in the ATM network, the step ST11 connects BUSs which broadcast data from a LEC in an ELAN within the ELAN by a VCC for transferring the data between the BUSs. The step ST12 transfers sending data received by the BUS in a first ELAN to the BUS in a second ELAN when the sending data is with respect to a LEC in this second ELAN and is received from a LEC in the first ELAN.

In this case, the BUS in the first ELAN can broadcast the data from the LEC in the first ELAN to the second ELAN, by simply connecting the VCC and the LEC in the first ELAN.

The BUS in the second ELAN may broadcast the data transferred via the VCC for transferring the data between the BUSs to all LECs within the second ELAN.

In this case, the BUS which receives the transferred data can broadcast the data in the second ELAN in place of the BUS which is directly connected to the LEC which sends the broadcast data.

When the BUS receives the data from the LEC, the BUS may confirm the ATM address of the BUS at the transfer destination by referring to an ATM junction table which stores the ATM address of the LEC and the ATM address of the corresponding BUS, and transfer the data to the BUS at the transfer destination. In addition, when the BUS refers to the ATM junction table and confirms that the transfer destination is itself, the BUS broadcasts the data to all LECs within the ELAN to which this BUS belongs.

In this case, it is possible to process the data at a high speed in units of ATM cells, by using the ATM junction table and determining whether to broadcast the data within the ELAN to which the BUS which receives the data belongs or to transfer the data to another ELAN, based on the ATM address of the ATM cell.

If the LEC is not registered in the ATM junction table, the received data may be assembled into upper layer packets from the ATM cells, and the BUS at the transfer destination may be judged from a destination network layer address (IP address) of the upper layer packet. The LEC may be registered in the ATM junction table using the destination network layer address (IP address) of the BUS at the transfer destination.

In this case, it is possible to newly register the LEC which is not registered in the ATM junction table.

In order to judge the BUS at the transfer destination from the network layer address (IP address) of the received data, an IP address table may be registered in each BUS. This IP address table stores the correspondence of the IP address and the name of the ELAN or the ATM address of the BUS.

In this case, when registering the LEC in the ATM junction table, it is possible to accurately determine the destination of the sending data of the LEC by use of the IP address table.

The LEC which is registered in the ATM junction table may be deleted after a predetermined time ($\Theta$ seconds) elapses from the registration thereof.

In this case, the destination of the sending data of the LEC can always be updated to the optimum destination by periodically deleting the contents of the ATM junction table.

The registration process with respect to the ATM junction table may be carried out if the data is received from the LEC that is registered in the ATM junction table, after a predetermined time ($\tau$ seconds, $\tau<\Theta$) elapses.

In this case, by carrying out the new registration process with respect to the ATM junction table at a period shorter than that of the periodic deletion process, it is possible to simultaneously broadcast the data from a LEC to a plurality of ELANs.

If a registration is made in the ATM junction table with respect to a packet at a destination address which is not registered in the IP address table, in order to guarantee a communication with an external network, the transfer destination may be registered in the ATM junction table as a gateway (router) to the external network.

In this case, when the LEC sends the data having the external network as the destination, the BUS transfers the data to the gateway (router), thereby guaranteeing the communication with the external network.

Figure 5:
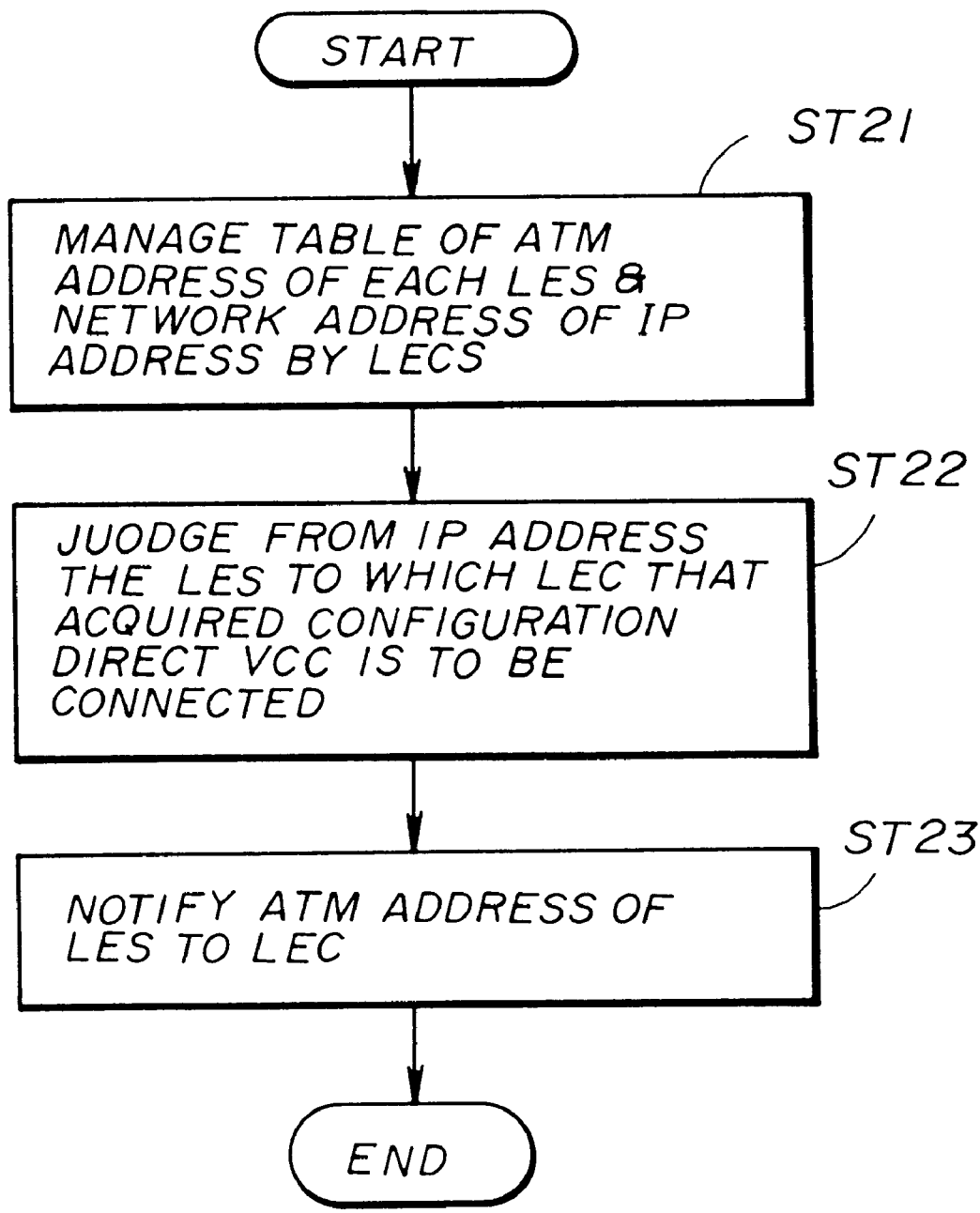
FIG. 5 is a flow chart for explaining a third aspect of the present invention.

A third aspect of the present invention will be described with reference to FIG. 5. FIG. 5 is a flow chart for explaining this third aspect of the present invention.

According to the third aspect of the present invention, a LAN connection method runs an existing LAN application in an ATM network, and includes steps ST21, ST22 and ST23 shown in FIG. 5. A LECS has a function of linking a LEC to a specific ELAN. The step ST21 manages a corresponding table of the network address of the IP address (network layer address) and the ATM address of each LES which copes with the address from the MAC address to the ATM address. The step ST22 judges from the IP address the LES to which the LEC is to be connected, where LEC acquires a configuration direct VCC which is an initial setting VCC with respect to the LECS. The step ST23 notifies the ATM address of the LES to the LEC.

In this case, since the LECS judges the LES to be connected based on the IP address of the LEC, it is possible to make a communication regardless of the physical position of the LEC.

Figure 1:
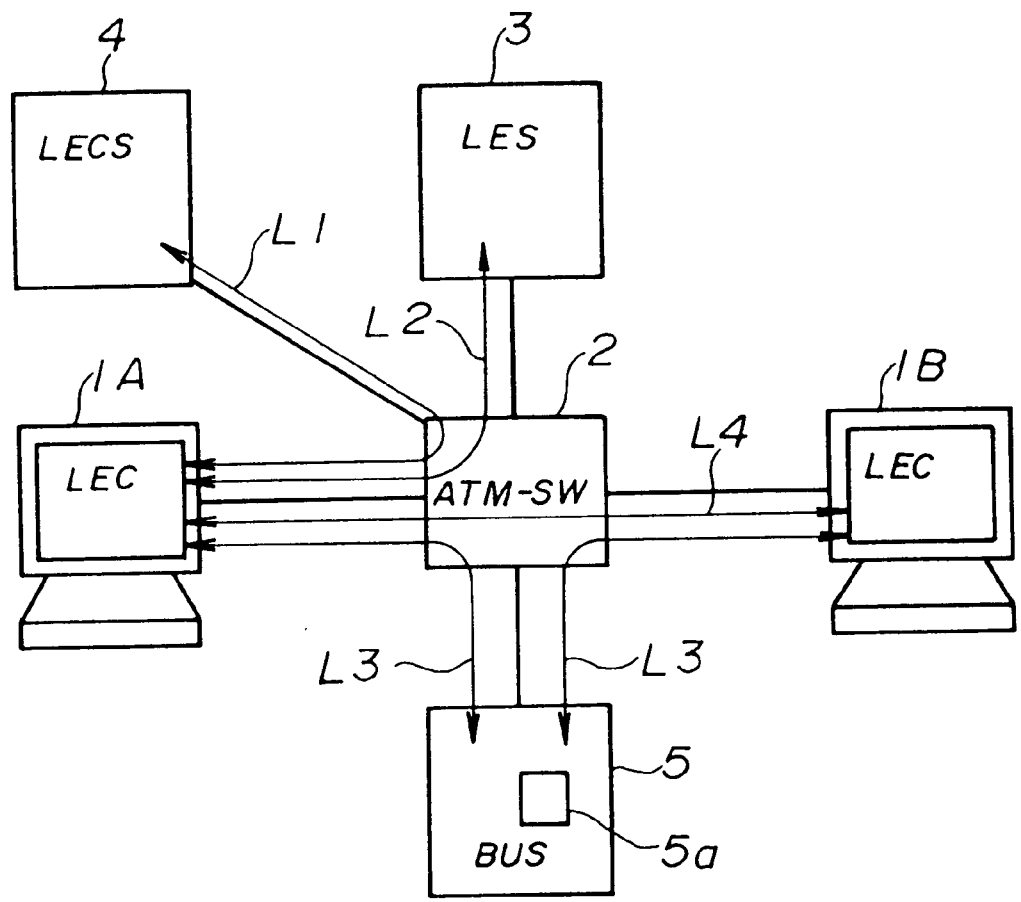
FIG. 1 is a diagram generally showing a conventional system.
Figure 2:
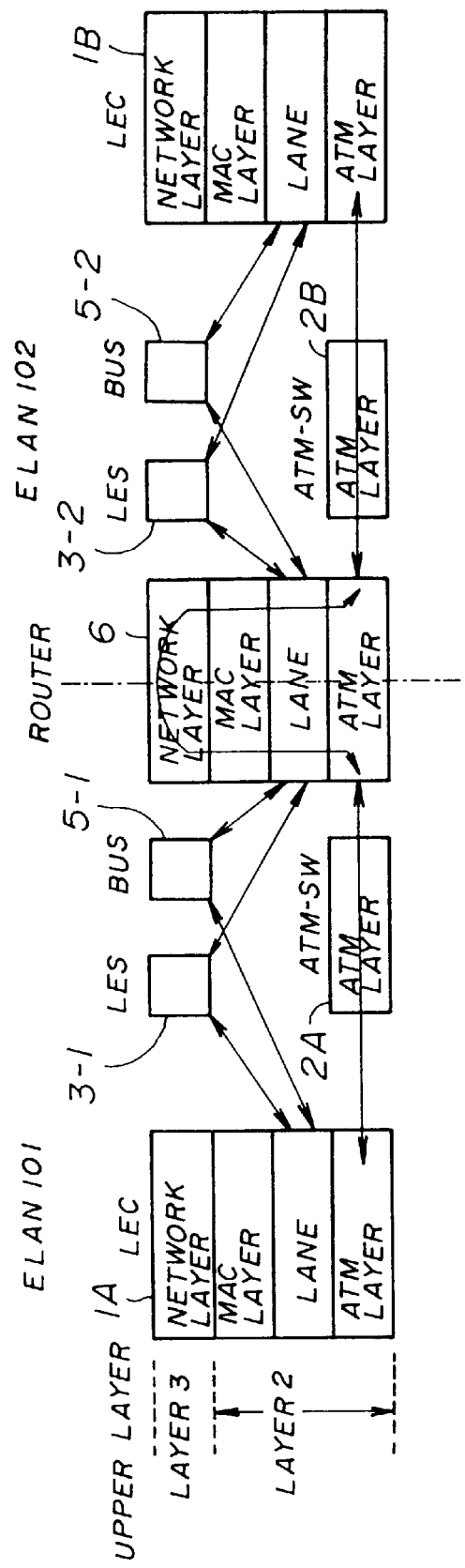
FIG. 2 is a diagram for explaining a conventional connection of ELANs.
Figure 6:
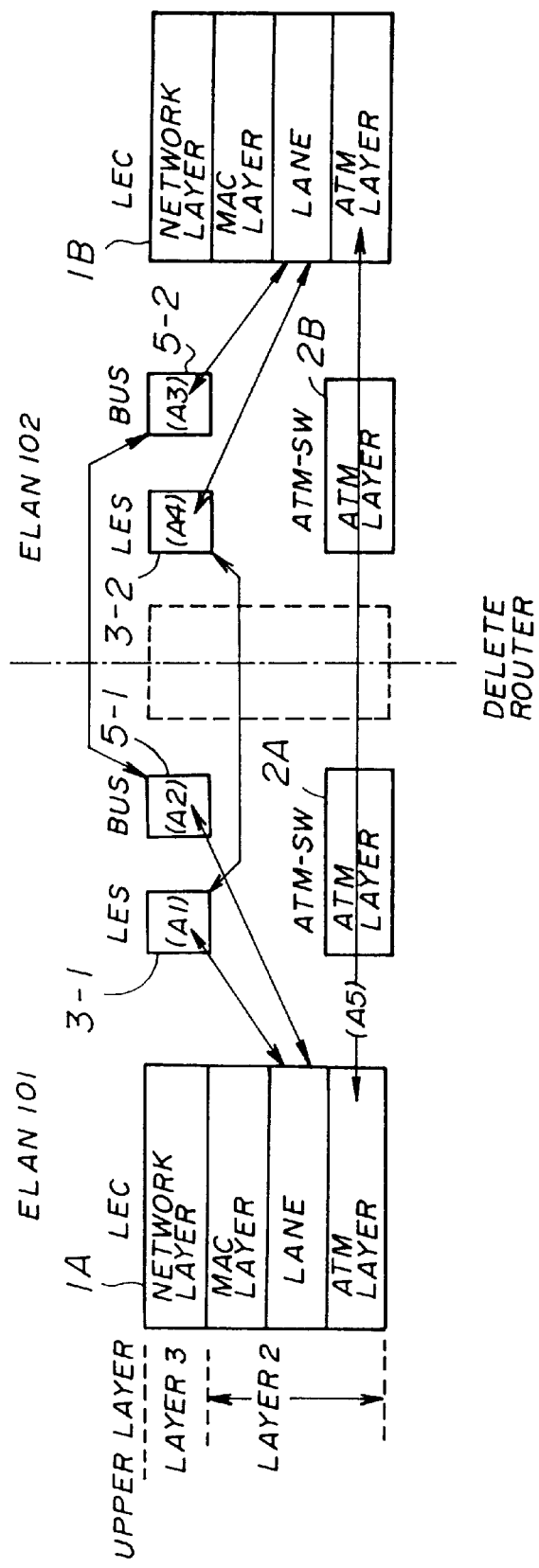
FIG. 6 is a diagram showing a system applied with an embodiment of a LAN connection method according to the present invention.

Next, a description will be given of an embodiment of a LAN connection method according to the present invention. FIG. 6 is a diagram showing a system applied with this embodiment of the LAN connection method. In FIG. 6, those parts which are the same as those corresponding parts in FIG. 2 are designated by the same reference numerals, and a description thereof will be omitted.

With respect to a LES which manages a certain ELAN, if a LEC makes a LE ARP request of an ATM address of a LEC in a different ELAN, the LES transfers the LE ARP request with respect to a LES which manages the concerned ELAN. The LES which manages the concerned ELAN and receives the transferred LE ARP request notifies the ATM address of the target LEC by a LE ARP response.

With respect to a BUS which manages a certain ELAN, when the LEC sends data to a LEC in a different ELAN, the BUS transfers the data with respect to a BUS in the concerned ELAN. The BUS which is in the concerned ELAN and receives the data transfer broadcasts the data with respect to all LECs in the concerned ELAN.

In FIG. 6, the LES 3-1 which receives the LE ARP request from the LEC 1A with respect to the LEC 1B confirms that the LEC 1B is not in the ELAN 101 to which the LES 3-1 belongs, and transfers the LE ARP request to the LES 3-2 in the ELAN 102, as indicated by (A1). In other words, each LES can notify with respect to a LEC an ATM address of a LEC in an ELAN other than the ELAN to which the LES belongs by merely managing the LEC in the ELAN to which the LES belongs.

On the other hand, the BUS 5-1 which receives the broadcast request data from the LEC 1A confirms from the network layer address (IP address) of the data to be broadcast that the data is to be broadcast in the ELAN 102, and the data from the LEC 1A is transferred to the BUS 5-2, as indicated by (A2).

The BUS 5-2 which receives the transfer data from the BUS 5-1 broadcasts the data in the ELAN 102, as indicated by (A3). In addition, the LES 3-2 returns the response (ATM address of the LEC 1B) to the LE ARP request to the LEC 1A via the LES 3-1, as indicated by (A4). Responsive to the LE ARP request from the LES 3-2, the LEC 1A acquires the connection VCC directly with the target LEC 1B, and the communication is made, as indicated by (A5) without via the BUSs 5-1 and 5-2. In other words, the LEC 1A and the LEC 1B make direct communication via the ATM switches 2A and 2B.

Figure 7:
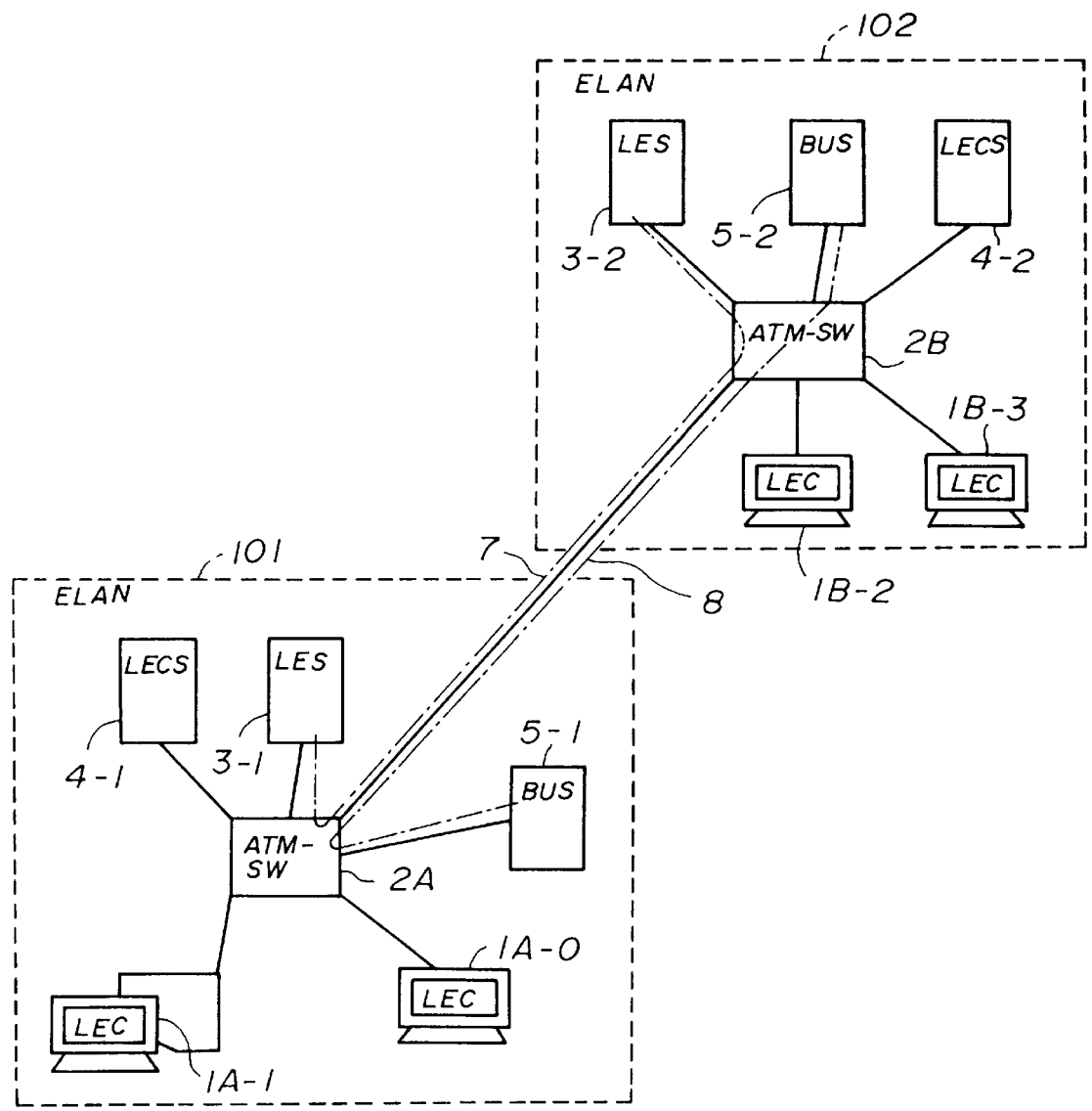
FIG. 7 is a diagram showing the construction of networks.

FIG. 7 is a diagram showing the construction of the networks in this embodiment. In FIG. 7, those parts which are the same as those corresponding parts in FIG. 6 are designated by the same reference numerals, and a description thereof will be omitted.

In FIG. 7, the ELAN 101 includes the ATM switch 2A, the LECs 1A-0 and 1A-1, the LES 3-1, the LECS 4-1 and the BUS 5-1. On the other hand, the ELAN 102 includes the ATM switch 2B, the LECs 1B-2 and LEC 1B-3, the LES 3-2, the LECS 4-2 and the BUS 5-2. A VCC 7 for LE ARP transfer is provided to connect the ELANs 101 and 102. A VCC 8 for inter-BUS data transfer is provided to connect the ELANs 101 and 102. Of course, the number of LECs within each of the ELANs 101 and 102 is not limited to that shown in FIG. 7, and an arbitrary number of LECs may be provided within each ELAN. A description will now be given of a case where the LEC 1A-1 is newly connected in the ELAN 101 in this state.

Figure 8:
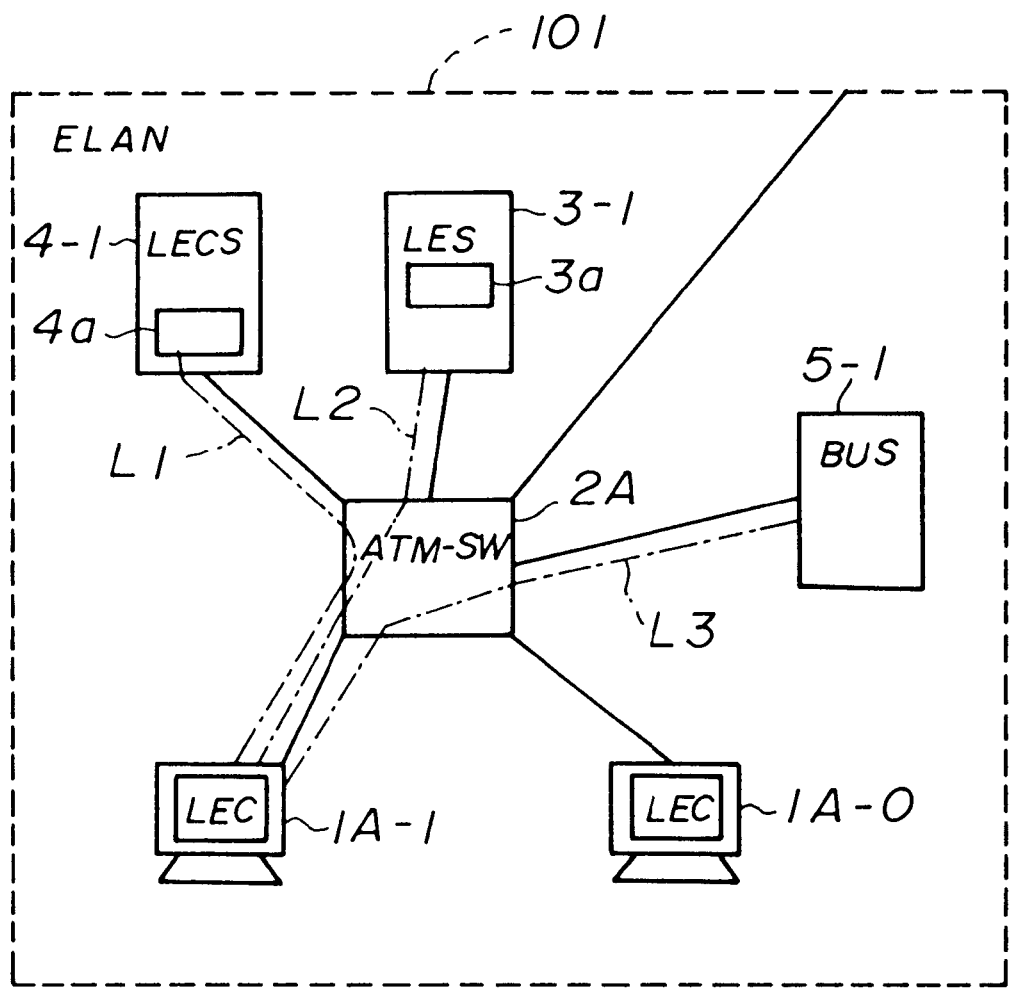
FIG. 8 is a diagram for explaining registration of a LEC in an ELAN.

(1) Registration of LEC in ELAN:

FIG. 8 is a diagram for explaining the registration of the LEC in the ELAN. In FIG. 8, those parts which are the same as those corresponding parts in FIG. 7 are designated by the same reference numerals, and a description thereof will be omitted.

In FIG. 8, a configuration direct VCC Li connects the ATM switch 2A and the LECS 4-1, and a control direct VCC/control distribute VCC L2 connects the ATM switch 2A and the LES 3-1. A multicast send VCC/multicast forward VCC L3 connects the ATM switch 2A and the BUS 5-1. A LEC management table 3a is provided within the LES 3-1, and manages the MAC addresses and the ATM addresses of all of the LECs within the ELAN 101. A table 4a is provided within the LECS 4-1, and manages the correspondences of the ATM addresses of each of the LESs provided within the ELAN 101 and the network addresses of the IP addresses.

The method of newly registering the LEC in the ELAN is identical to the conventional LANE protocol. In order for the LEC 1A-1 to operate as a LEC of the ELAN 101, the LEC 1A-1 recognizes the ATM address thereof and the ATM address of the LECS 4-1 within the ELAN 101 when the power of the LEC 1A-1 is turned ON. The LEC 1A-1 acquires the configuration direct VCC L1 between the LEC 1A-1 and the LECS 4-1. The LEC 1A-1 obtains the ATM address of the LES 3-1, the name of the ELAN 101 and the like from the LECS 4-1 via this configuration direct VCC L1. In this embodiment, the ELAN to which the LEC belongs is not limited by a physical connection, and is dependent on the ELAN which includes the LES to which the LEC is connected.

The ELAN is equivalent to a sub network which is managed by the IP address. Hence, the LECS 4-1 judges the LES to which the LEC 4-1 is to be connected from the IP address, and notifies the ATM address of the LES. For this reason, each LECS is provided with the table 4a which manages the correspondences of the IP addresses and the ATM addresses of the LESs to be connected. Hence, the communication can be made regardless of the physical position of the LEC by judging in the LECS the LES to which the connection is to be made based on the IP address of the LEC.

Thereafter, the LEC 1A-1 acquires the control direct VCC L2 between the LEC 1A-1 and the LES 3-1, and the LES 3-1 acquires the control distribute VCC L2 between the LES 3-1 and the LEC 1A-1. In this state, the LES 3-1 registers the LEC 1A-1 in the LEC management table 3a which manges the MAC addresses and the ATM addresses of all LECs within the ELAN 101. At the same time, the LES 3-1 notifies an identifier (LEC ID) of the ELAN 101 to the LEC 1A-1.

Finally, the LEC 1A-1 uses the LE ARP request and obtains the ATM address of the BUS 5-1 from the LES 3-1. As a result, the LEC 1A-1 acquires the multicast send VCC L3 with respect to the BUS 5-1, and the BUS 5-1 acquires the multicast forward VCC L3 with respect to the LEC 1A-1. The data transmission of the LEC 1A-1 becomes possible by the above described sequence.

Figure 9:
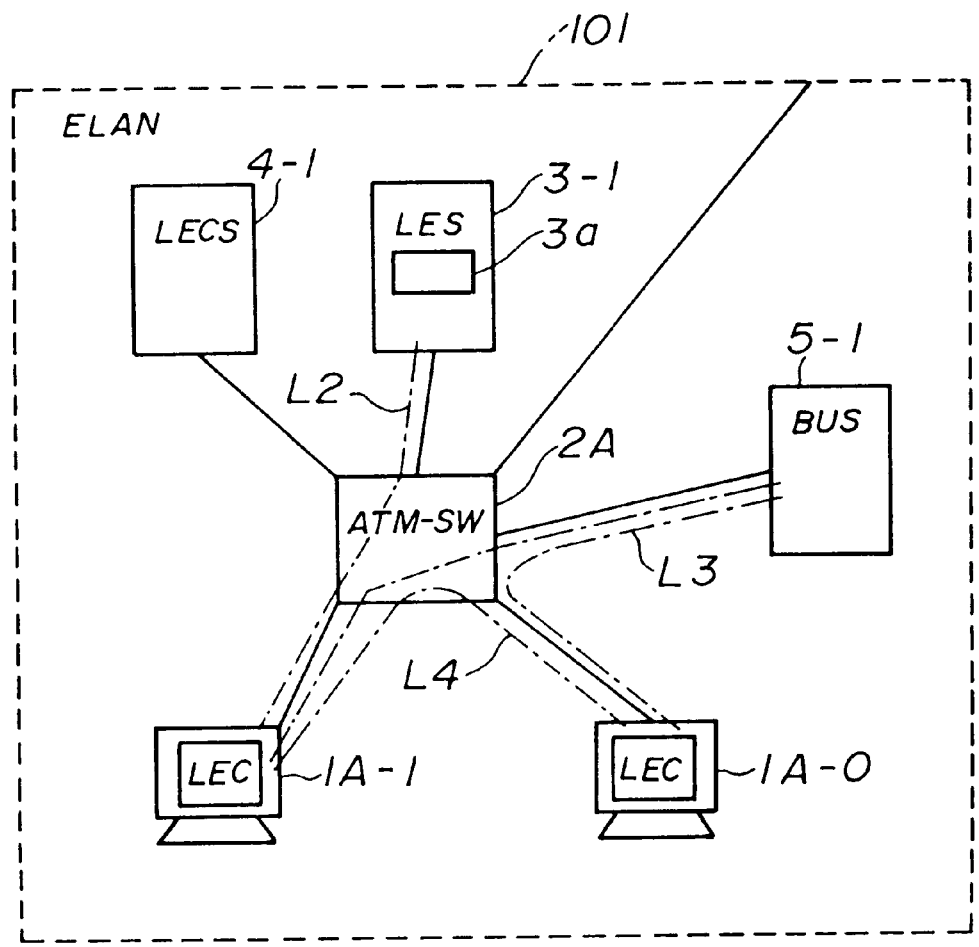
FIG. 9 is a diagram for explaining a communication of the LEC within the ELAN.

(2) Communication of LEC Within ELAN:

FIG. 9 is a diagram for explaining the communication of the LEC within the ELAN. In FIG. 9, those parts which are the same as those corresponding parts in FIG. 8 are designated by the same reference numerals, and a description thereof will be omitted.

In FIG. 9, the acquired control direct VCC/control distribute VCC L2 connects the LEC 1A-1 and the LES 3-1, and the acquired multicast send VCC/multicast forward VCC L3 connects the BUS 5-1 and the LECs 1A-0 and 1A-1. An acquired data direct VCC L4 connects the LEC 1A-0 and the LEC 1A-1. The LEC management table 3a within the LES 3-1 manages the ATM addresses with respect to the MAC addresses of the LECs 1A-0 and 1A-1.

When the LEC 1A-1 communicates with the LEC 1A-0, the MAC address and the ATM address of the LEC 1A-0 must be obtained from the IP address of the LEC 1A-0. The means of obtaining the MAC address from the IP address is called an IP ARP. The LEC 1A-1 sends an IP ARP request to inquire the MAC address of the LEC 1A-0 with respect to the BUS 5-1 using the VCC L3. In response to this IP ARP request, the BUS 5-1 recognizes that a transfer destination IP address (IP address of the LEC 1A-0) is an address within the ELAN 101 to which the BUS 5-1 belongs, and broadcasts the IP ARP request with respect to all LECs 1A within the ELAN 101.

When the LEC 1A-0 receives the broadcast IP ARP request, the LEC 1A-0 recognizes that the destination of the IP ARP request is the LEC 1A-0 itself, and sends an IP ARP response to the BUS 5-1. The other LEC 1A-1 confirms from the IP address that the destination of the IP ARP request is not the LEC 1A-1, and does not respond to the IP ARP request. When the BUS 5-1 receives the IP ARP request, the BUS 5-1 confirms that the transfer destination IP address (IP address of the LEC 1A-1) is an address within the ELAN 101 to which the BUS 5-1 belongs, and broadcasts the IP ARP response to all LECs within the ELAN 101. The LEC 1A-1 obtains the MAC address of the LEC 1A-0 from the broadcast IP ARP response.

Next, the LEC 1A-1 obtains the ATM address of the LEC 1A-0 from the MAC address. In other words, the LEC 1A-1 sends a LE ARP request which inquires the ATM address of the LEC 1A-0 with respect to the LES 3-1 using the VCC L2. The LES 3-1 recognizes the ATM address of the LEC 1A-0 by referring to the LEC management table 3a based on the MAC address of the LEC 1A-0 in response to the LE ARP request. The ATM address of the LEC 1A-0 is returned to the LEC 1A-1 as a LE ARP response using the VCC L2.

Even while the LEC 1A-1 waits for the LE ARP response from the LES 3-1, the LEC 1A-1 sends the data having the LEC 1A-0 as the destination towards the BUS 5-1 so as to eliminate a communication delay. When the BUS 5-1 receives the data from the LEC 1A-1, the BUS 5-1 recognizes that the transfer destination IP address (IP address of the LEC 1A-0) of the data is an address within the ELAN 101 to which the BUS 5-1 belongs, and guarantees the data transfer to the LEC 1A-0 by broadcasting the data to all LECs within the ELAN 101. When the LEC 1A-1 receives the ATM address of the LEC 1A-0 from the LES 3-1, the LEC 1A-1 acquires the VCC L4 directly between the LEC 1A-1 and the LEC 1A-0. Thereafter, the LEC 1A-1 interrupts sending the data to the BUS 5-1, and sends the data directly to the LEC 1A-0.

(3) Communication of LEC Within ELAN:

When the LEC 1A-1 communicates with the LEC 1B-2, the LEC 1A-1 must obtain the MAC address and the ATM address of the LEC 1B-2 from the IP address of the LEC 1B-2.

(3-1) Functions of LES:

FIG. 10 is a diagram for explaining the operation of the LES. In FIG. 10, those parts which are the same as those corresponding parts in FIGS. 6 and 8 are designated by the same reference numerals, and a description thereof will be omitted. In FIG. 10, the LES 3-1 is provided with the LEC management table 3a, a communication control unit 3b, and a LE ARP response table 3c. On the other hand, the LEC 3-2 is provided with the LEC management table 3a.

In the system shown in FIG. 10, the role of the LES 3-1 is to respond to the LE ARP request from the LEC 1A-1. When the LES 3-1 receives the inquiry of the ATM address (LE ARP) from the LEC 1A-1, as indicated by (B1), the LES 3-1 refers to its LEC management table 3a and retrieves the MAC address of the LEC 1B-2, as indicated by (B2). Because the LEC 1B-2 is provided in the ELAN 102, it can be recognized that the LEC 1B-2 is not registered in the LEC management table 3a of the LES 3-1 within the ELAN 101.

FIGS. 11A and 11B are diagrams showing the constructions of the LEC management table. FIG. 11A shows the construction of the LEC management table 3a within the LES 3-1, and FIG. 11B shows the construction of the LEC management table 3a within the LES 3-2. For example, the ATM address with respect to the MAC address "LEC0xxxx" is "xxxxxLEC0" in FIG. 11A, where LEC0 refers to the LEC 1A-0. Further, the ATM address with respect to the MAC address "LEC2xxxx" is "xxxxxLEC2" in FIG. 11B, where LEC2 refers to the LEC 1B-2.

Then, the LES 3-1 transfers the LE ARP request from the communication control unit 3b to all LESs which acquired the VCC for the LE ARP transfer, as indicated by (B3) in FIG. 10. Hence, the LES 3-1 can notify the ATM address of the LEC in the ELAN other than the ELAN 101 with respect to the LEC within the ELAN 101, by merely managing the LECs in the ELAN 101 to which the LES 3-1 belongs.

In this state, in order to manage the state in which the LE ARP response from the LEC 1B-2 is waited, the LES 3-1 makes a registration in the LE ARP response table 3c, as indicated by (B4). FIG. 12 is a diagram showing the construction of the LE ARP response table. As shown in FIG. 12, the requesting LEC and the responding LEC are registered in the LE ARP response table 3c. The MAC address and the ATM address are managed by the requesting LEC, and the MAC address is managed by the responding LEC. Accordingly, the LES 3-1 can determine whether or not to transfer the LE ARP request using only the LEC management table 3c thereof.

The LES 3-2 which receives the LE ARP request transferred from the LES 3-1 refers to the LEC management table 3a of the LES 3-2, as indicated by (B5), and confirms the MAC address of the LEC 1B-2. Next, the LES 3-2 transfers the LE ARP response of the LEC 1B-2 with respect to the LES 3-1 via the VCC for LE ARP transfer, as indicated by (B6). As a result, with respect to a LES which transferred the LE ARP request, another LES which receives this LE ARP request can return the LE ARP response.

The LES 3-1 which receives the LE ARP response confirms that the LE ARP response is to be returned to the LEC 1A-1 by referring to the LE ARP response table 3c of the LES 3-1, and sends the LE ARP response of the LEC 1B-2 with respect to the LEC 1A-1, as indicated by (B7). In addition, the LEC 1A-1 is deleted from the LE ARP response table 3c, because the process with respect to the LEC 1A-1 ends. Therefore, the LES which receives the LE ARP response from another LES can quickly transfer the LE ARP response to the target LEC by using the LE ARP response table.

Figure 13:
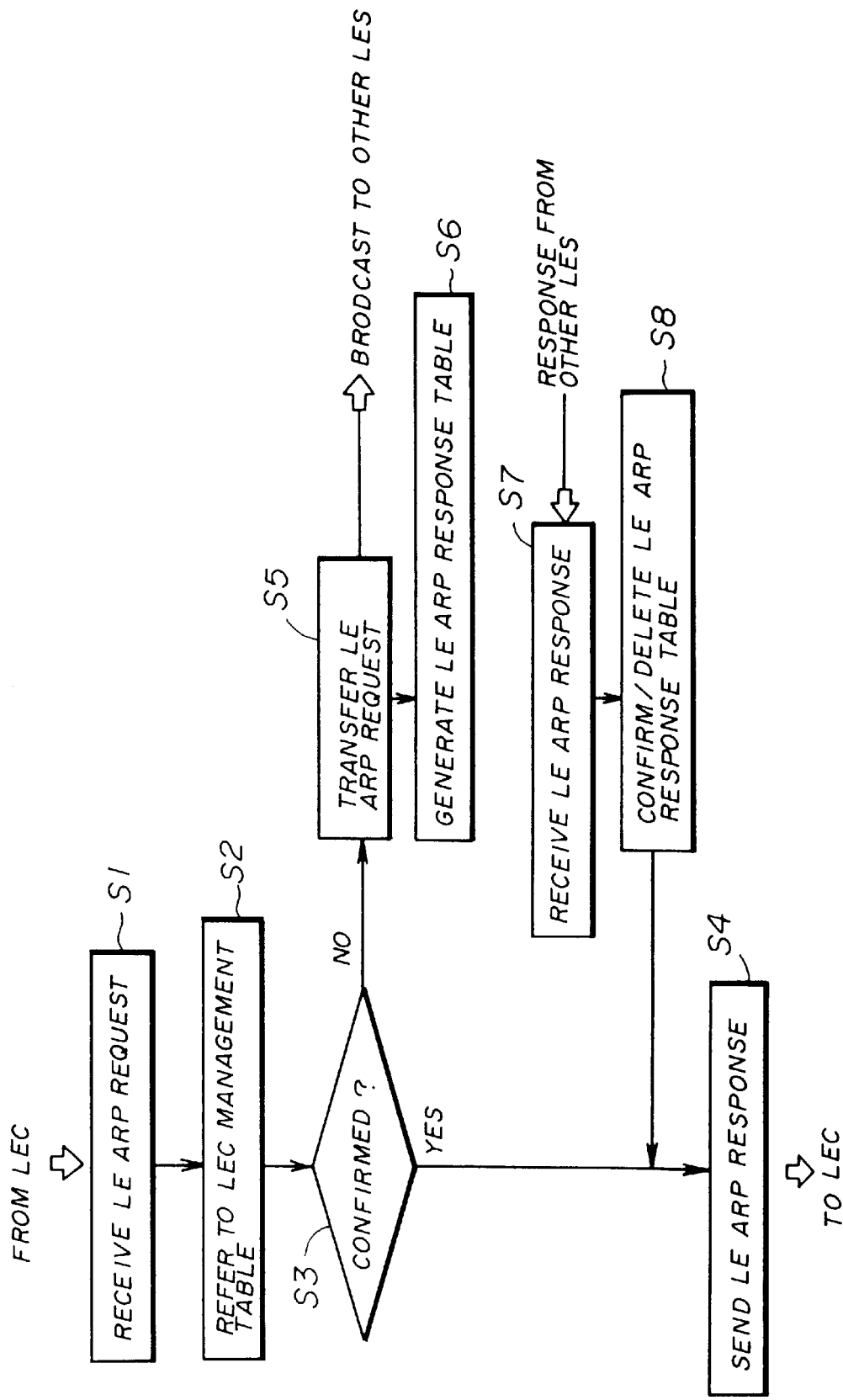
FIG. 13 is a flow chart for explaining the operation of the LES which receives a LE ARP request.

FIG. 13 is a flow chart for explaining the operation of the LES which receives the LE ARP request.

In FIG. 13, when a step S1 receives the LE ARP request from the LEC, a step S2 refers to the LEC management table 3a of the LES which receives the LE ARP request. A step S3 confirms whether or not the MAC address corresponding to the LEC exists in the LEC management table 3a. If the decision result in the step S3 is YES, a step S4 sends the LE ARP response with respect to the LEC.

On the other hand, if the decision result in the step S3 is NO, a step S5 broadcasts the received LE ARP request with respect to the LES within the ELAN other than the ELAN to which the LES which receives the LE ARP request belongs. A step S6 generates the LE ARP response table 3c. Next, when a step S7 receives the LE ARP response from the LES within the other ELAN, a step S8 refers to the LE ARP response table 3c to confirm whether the LE ARP response is received from the target LES, and deletes the LEC which belongs to the same ELAN as the LES which receives the LE ARP request from the LE ARP response table 3c if the LE ARP response is received from the target LES. Then, the process advances to the step S4 which sends the LE ARP response with respect to the LEC belonging to the same ELAN as the LES which receives the LE ARP request.

Figure 14:
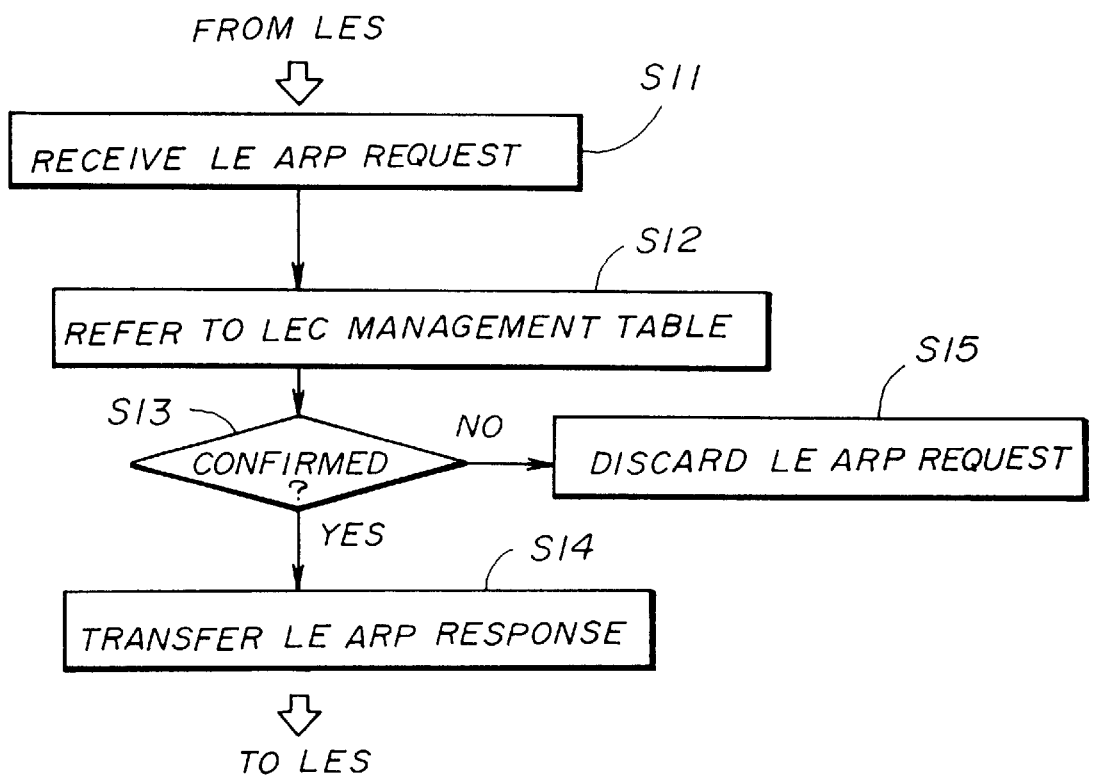
FIG. 14 is a flow chart for explaining the operation of a LES which receives the LE ARP request transferred from another LES.

FIG. 14 is a flow chart for explaining the operation of the LES which receives the LE ARP request from another LES within another ELAN.

In FIG. 14, when a step S11 receives the LE ARP request from another ELAN, a step S12 refers to the LEC management table 3a and a step S13 checks whether or not the target MAC address exists in the LEC management table 3a. If the decision result in the step S13 is YES, a step S14 transfers the LE ARP response (ATM address of the LEC) with respect to the LES in the other ELAN. On the other hand, if the decision result in the step S13 is NO, a step S15 discards the LE ARP request.

Figure 15:
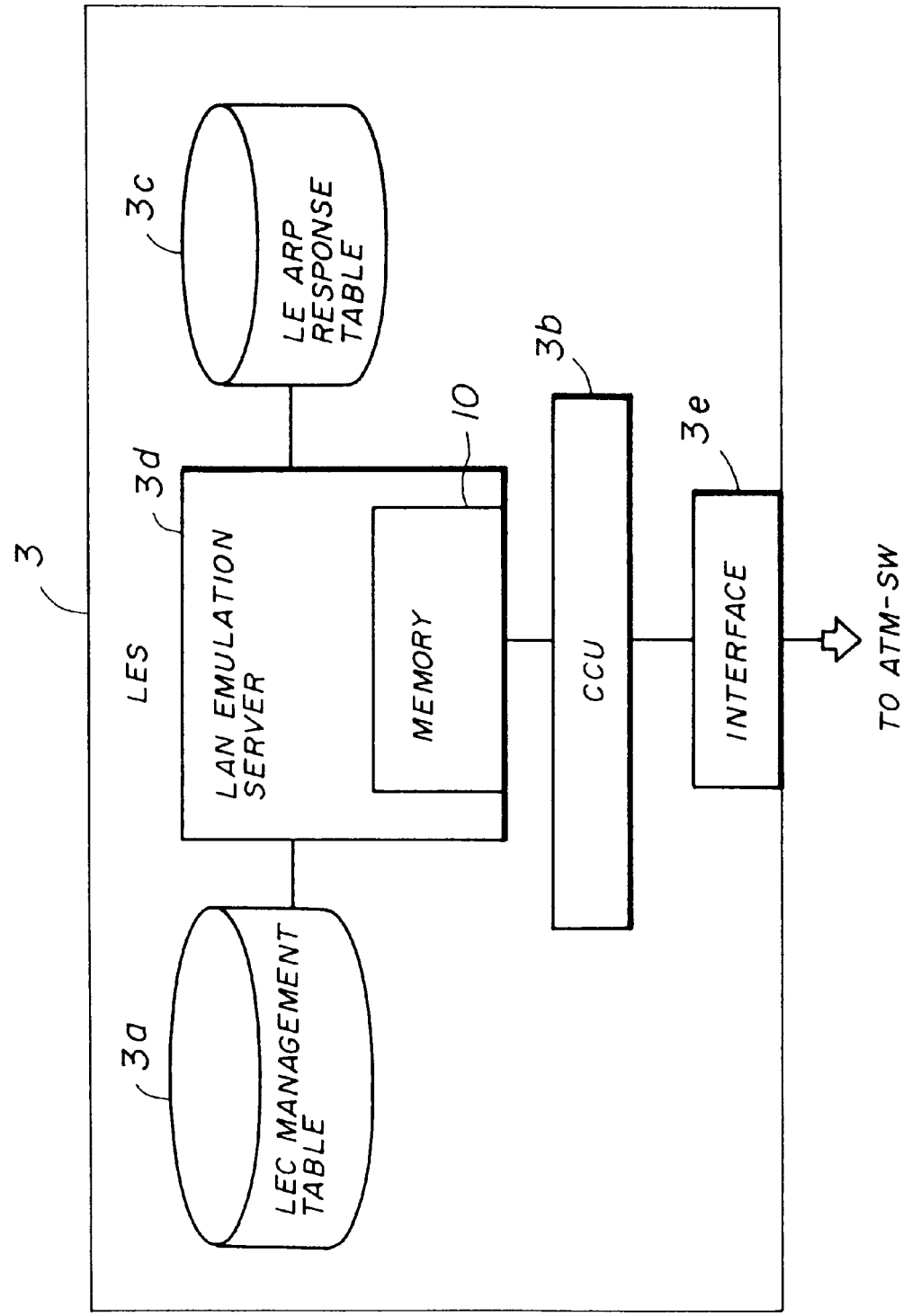
FIG. 15 is a system block diagram showing the construction of the LES.

FIG. 15 is a system block diagram showing the construction of the LES. In FIG. 15, those parts which are the same as those corresponding parts in FIG. 10 are designated by the same reference numerals, and a description thereof will be omitted.

In FIG. 15, the LES 3 includes the LEC management table 3a, the communication control unit 3b which assembles and disassembles the cells, the LE ARP response table 3c, a LAN emulation server 3d, and a line interface 3e. The LAN emulation server 3d is coupled to the LEC management table 3a and the LE ARP response table 3c, and controls the entire operation of the LES 3. This LAN emulation server 3d includes a main memory 10. The line interface 3e is coupled to the ATM switch 2.

The LE ARP request received by the line interface 3e is supplied to the LAN emulation server 3d via the communication control unit 3b. The LAN emulation server 3d refers to the LEC management table 3a and the LE ARP response table 3c, and carries out the operation described above in conjunction with FIGS. 13 and 14.

(3-2) Functions of BUS:

The function of the BUS is to broadcast the data from the LEC to within the ELAN. In this embodiment, the BUS has a router function and an ATM switch function. With respect to the data from the LEC, the BUS can judge and store the VCC for inter-BUS data transfer between the ELAN at the transfer destination, based on the IP address of the data, and the BUS switches and transfers the data based on the ATM address. Hence, the BUS can broadcast the data from the LEC to another ELAN by simply connecting the LEC and the VCC in the ELAN to which the BUS belongs.

The data from the LEC can be categorized into one of the following two kinds, namely, the IP ARP and the data send to the LEC on the other end before acquiring the data direct VCC.

Figure 16:
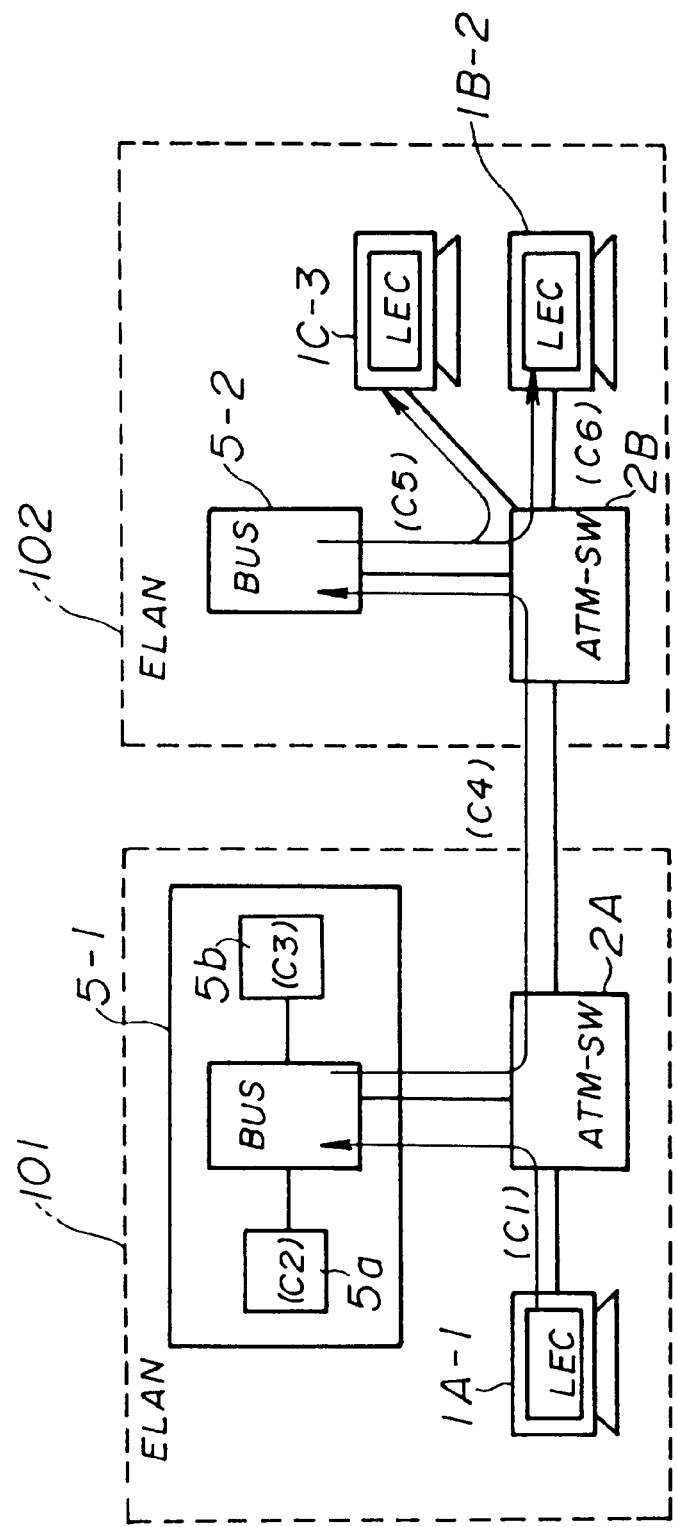
FIG. 16 is a diagram for explaining the operation of a BUS.

The BUS operates in the same manner with respect to the two-way data. FIG. 16 is a diagram for explaining the operation of the BUS. In FIG. 16, the ELAN 101 includes the LEC 1A-1, the ATM switch 2A and the bus 5-1. On the other hand, the ELAN 102 includes the LECs 1B-2 and 1C-3, the ATM switch 2B and the BUS 5-2. The BUS 5-1 within the ELAN 101 includes an IP address table 5a, and an ATM junction table 5b. In the following description, it will be assumed for the sake of convenience that the LEC 1A-1 sends the data having the LEC 1B-2 as the destination with respect to the BUS 5-1, before acquiring the data direct VCC between the LEC 1A-1 and the LEC 1B-2.

When the BUS 5-1 receives from the LEC 1A-1 the data (cells) having the LEC 1B-2 as the destination, the BUS 5-1 once assembles the received data into IP packets, as indicated by (C1) in FIG. 16. Then, the BUS 5-1 reads the network address portion of the IP address, and recognizes that the destination of the data from the LEC 1A-1 is the ELAN 102 by referring to the IP address table 5a, as indicated by (C2).

FIG. 17 is a diagram showing the construction of the IP address table. As shown in FIG. 17, the IP address table 5a is made up of the network address, the name of the ELAN, and the ATM address of the BUS. The corresponding ELAN 102 can be recognized from the network address. Hence, when registering the LEC in the ATM junction table 5b, the IP address table 5a can be used so that the destination of the sending data of the LEC can be accurately determined.

The BUS 5-1 which recognizes that the destination of the data from the LEC 1A-1 is the ELAN 102 makes a registration in the ATM junction table 5b in order to relate the multicast send VCC which connects the BUS 5-1 and the LEC 1A-1 and the VCC for inter-BUS data transfer which connects the BUS 5-1 and the BUS 5-2, as indicated by (C3) in FIG. 16.

FIG. 18 is a diagram showing the construction of the ATM junction table 5b. As shown in FIG. 18, the ATM junction table 5b is made up of the ATM address of the LEC, the ATM address of the BUS, and the time for maintaining the data.

In this embodiment, if the LEC is not registered in the ATM junction table 5b, the received data is assembled into upper layer packets from the ATM cells, and the transfer destination BUS is judged from the destination network layer address (IP address). The ATM address of the transfer destination BUS is registered in the ATM junction table 5b, thereby newly registering the LEC which is not registered in the ATM junction table 5b. The registration is maintained for a time of Θ seconds.

Thereafter, the data from the LEC 1A-1 is subjected to the switching within the BUS 5-1 in the ATM cell form with respect to the BUS 5-2 based on the ATM junction table 5b, as indicated by (C4). Hence, the data can be processed at a high speed in units of ATM cells by determining whether to broadcast the ATM cells within the ELAN 501 to which the BUS 5-1 belongs or to transfer the ATM cells to another ELAN (502) based on the ATM address, by use of the ATM junction table 5b.

In this case, the contents of the ATM junction table 5b are maintained for Θ seconds, and thereafter, the IP packets are assembled again so as to make a re-registration in the ATM junction table 5b. By periodically deleting the contents of the ATM junction table 5b, it becomes possible to constantly update the destination of the sending data of the LEC to an optimum destination.

The BUS 5-2 which receives the data from the BUS 5-1 and issued from the LEC 1A-1 is set so as to broadcast all data transferred via the VCC for inter-BUS data transfer within the ELAN 102. Thus, the data received by the BUS 5-2 is transferred to all LECs within the ELAN 102, as indicated by (C5). The data from the LEC 1A-1 is thus broadcast within the ELAN 102 in this manner. The broadcast data is received only by the LEC 1B-2 in this case, as indicated by (C6). Therefore, in place of the BUS which is directly connected to the LEC which sent the broadcast data, another BUS which receives the transferred data can broadcast the data in an ELAN other than the ELAN to which the LEC belongs.

Figure 19:
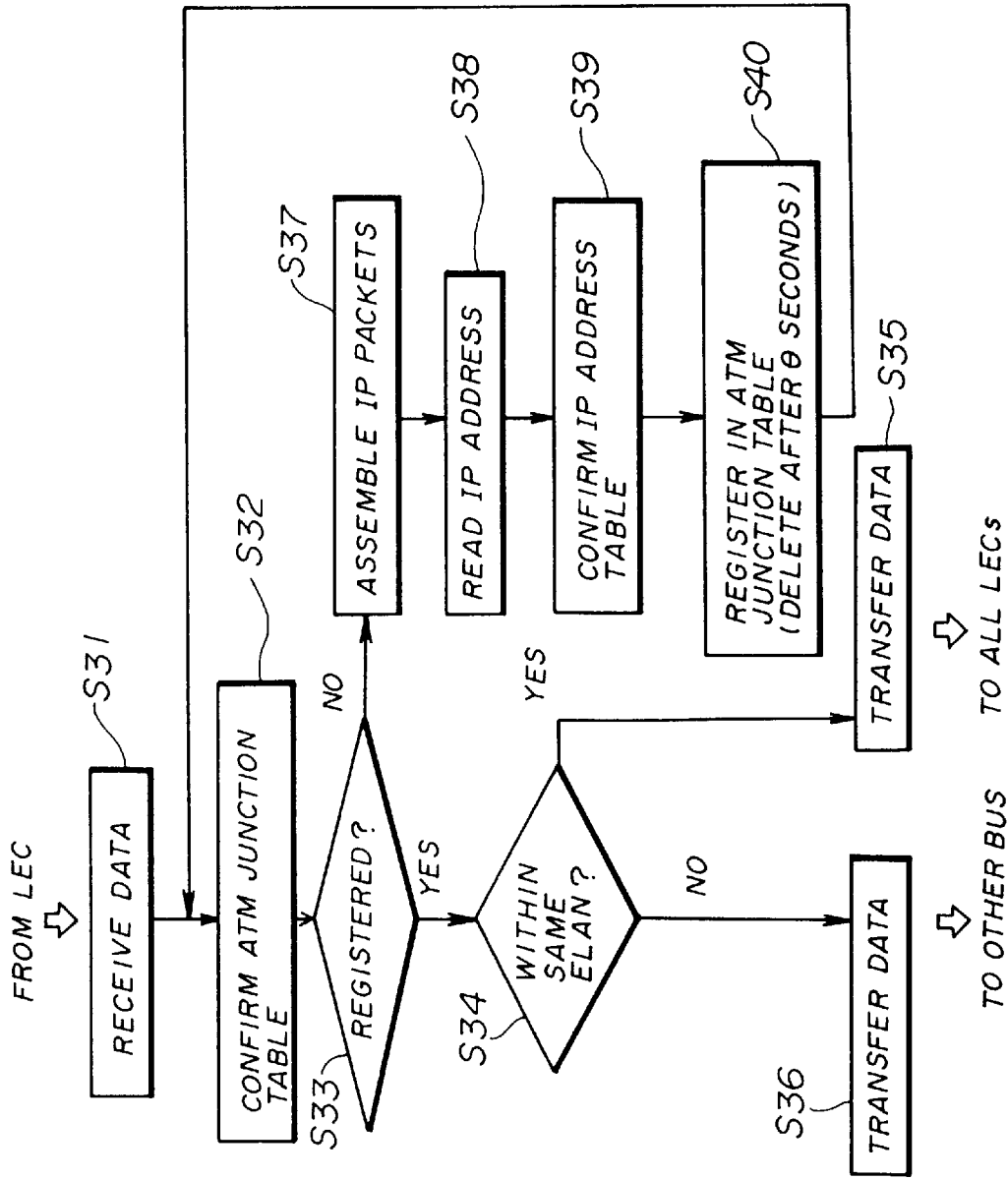
FIG. 19 is a flow chart for explaining the operation of the BUS which receives data from the LEC.

FIG. 19 is a flow chart for explaining the operation of the BUS which receives the data from the LEC. More particularly, FIG. 19 shows the operation of the BUS 5-1 which receives the data from the LEC 1A-1. In FIG. 19, when a step S31 receives the data from the LEC 1A-1, a step S32 confirms the ATM junction table 5b. A step S33 checks whether or not the LEC 1A-1 is registered in the ATM junction table 5b. If the decision result in the step S33 is YES, a step S34 checks whether or not the destination of the data is the ELAN 101 to which the BUS 5-1 belongs. If the decision result in the step S34 is YES, a step S35 transfers the data to all LECs within the ELAN 101. On the other hand, if the decision result in the step S34 is NO, a step S36 transfers the data to another BUS, that is, the BUS 5-2 in this case.

If the decision result in the step S33 is NO, a step S37 once assembles the received data into IP packets. A step S38 reads the network address portion of the IP address, and a step S39 refers to the IP address table 5a to confirm that the destination of the data from the LEC 1A-1 is the ELAN 102. After the BUS 5-1 recognizes that the destination of the data from the LEC 1A-1 is the ELAN 102, a step S50 makes a registration in the ATM junction table 5b so as to relate the multicast send VCC which connects the BUS 5-1 to the LEC 1A-1 and the VCC for inter-BUS data transfer which connects the BUS 5-1 to the BUS 5-2. The contents registered in the ATM junction table 5b are deleted after Θ seconds. The registered contents of the ATM junction table 5b are deleted because a certain LEC does not always communicate with the same LEC. After the step S40, the process returns to the step S32, so as to confirm the ATM junction table 5b.

Figures 20, 21:
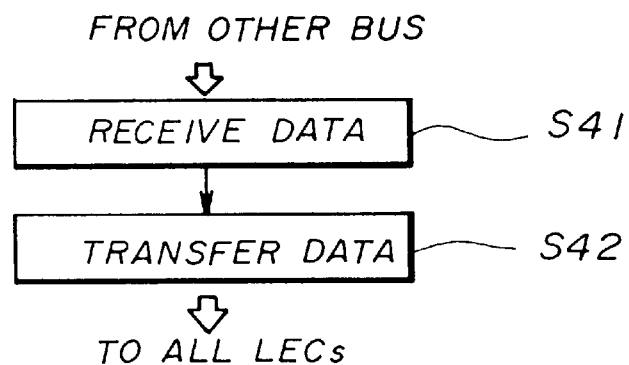
FIG. 20 is a flow chart for explaining the operation of the BUS which receives data from another BUS.
FIG. 21 is a diagram for explaining the construction of an ATM junction table of the BUS.

FIG. 20 is a flow chart for explaining the operation of the BUS which receives the data from another BUS. More particularly, FIG. 20 shows the operation of the BUS 5-2 which receives the data from the BUS 5-1. In FIG. 20, a step S41 receives the data from the other BUS 5-1. Then, a step S42 transfers the received data to all LECs within the ELAN 102 to which the BUS 5-2 belongs.

The data from the LEC is transferred to the BUS using the ATM junction table, in order to prevent a delay every time the ATM cells are assembled into IP packets. In addition, the registered contents of the ATM junction table are deleted after Θ seconds, because a LEC does not necessarily always communicate with the same LEC.

Next, a description will be given of a case where the LEC 1A-1 tries to start communicating simultaneously with the LEC 2B-2 within the ELAN 102 and the LEC 1A-0 within the ELAN 101. According to the flow chart shown in FIG. 19, the LEC 1A-1 cannot communicate via the BUS with 2 LECs simultaneously. This is because the ELAN 102 is registered in the ATM junction table 5b of the BUS 5-1, and even if an attempt were made to send the data having the LEC 1A-0 within the ELAN 101 as the destination, the BUS 5-1 would transfer the data having the LEC 1A-0 as the destination to the ELAN 102.

Accordingly, in FIG. 19, the registration timing with respect to the ATM junction table 5b is set so that a condition (i) that the LEC 1A-1 is not registered in the ATM junction table 5b and a condition (ii) that τ seconds have elapsed from the time when the LEC 1A-1 is registered in the ATM junction table 5, where τ<Θ, are simultaneously satisfied. When these conditions (i) and (ii) are simultaneously satisfied and the LEC 1A-1 attempts to start communicating with the LEC 1B-2 within the ELAN 102 and the LEC 1A-0 within the ELAN 101 at the same time, the registration with respect to the ATM junction table 5b is made as shown in FIG. 21.

In FIG. 21, the ATM junction table 5b is registered with the ATM address "xxxxxBUS2" of the BUS and the maintaining time of "τ seconds" with respect to the ATM address "xxxxxLEC1" of the LEC, where BUS2 refers to the BUS 5-2 and LEC1 refers to the LEC 1A-1. In addition, the ATM address "xxxxxBUS1" is also registered in the ATM junction table 5b with respect to the ATM address "xxxxxLEC1" of the LEC, where BUS1 refers to the BUS 5-1. Hence, the sending data from the LEC 1A-1 is simultaneously broadcast to the ELAN 101 and the ELAN 102, thereby guaranteeing simultaneous communication among the LEC 1A-1 and the LEC 1A-0 within the same ELAN 101 to which the LEC 1A-1 belongs and the LEC 1B-2 within the ELAN 102 other than the ELAN 101, that is, outside the ELAN 101. In other words, by periodically making the new registration to the ATM junction table 5b at a period τ which is shorter than the predetermined time of Θ seconds after which the contents of the ATM junction table 5b is deleted, it is possible to simultaneously broadcast the data from one LEC to a plurality of ELANs.

Figure 22:
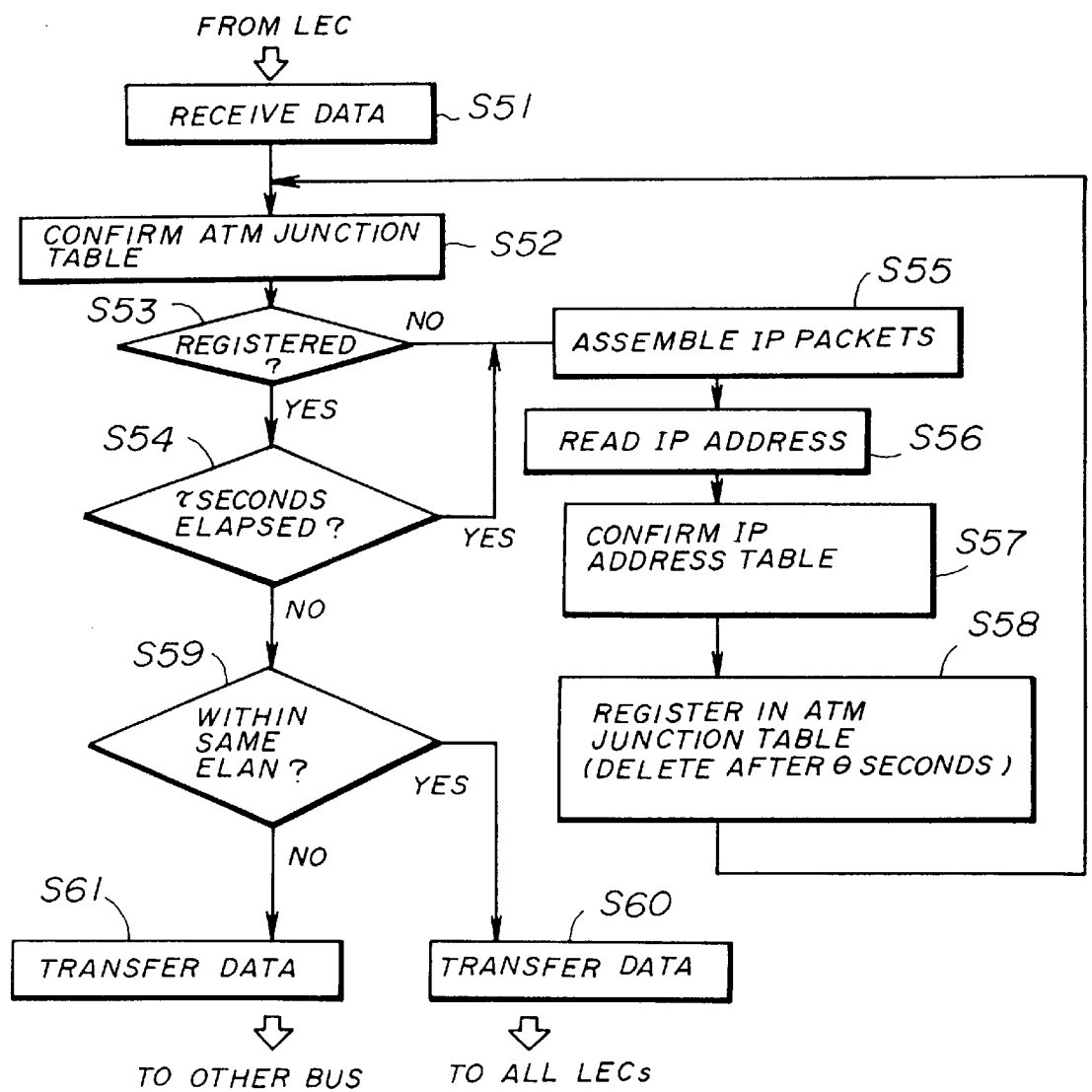
FIG. 22 is a flow chart for explaining the operation of another bus which receives data from the LEC.

FIG. 22 is a flow chart for explaining the operation of the BUS which receives the data from the LEC. More particularly, FIG. 22 shows the operation of the BUS 5-1 for the case where the simultaneous communication among one LEC and two or more other LECs is guaranteed.

In FIG. 22, when a step S51 receives the data from the LEC 1A-1, a step S52 confirms the ATM junction table 5b of the BUS 5-1. A step S53 checks whether or not the LEC 1A-1 is registered in the ATM junction table 5b. If the decision result in the step S53 is YES, a step S54 checks whether or not a time of τ seconds have elapsed from the time of registration. If the decision result in the step S54 is YES, a step S55 once assembles the received data into IP packets. A step S56 reads the network address portion of the IP address, and a step S57 refers to the IP address table 5a of the BUS 5-1 and confirms that the destination of the data received from the LEC 1A-1 is the ELAN 102. After confirming that the destination of the data received from the LEC 1A-1 is the ELAN 102, a step S58 makes a registration in the ATM junction table 5b of the BUS 5-1 so as to relate the multicast send VCC which connects the BUS 5-1 and the LEC 1A-1 and the VCC for inter-BUS data transfer which connects the BUS 5-1 and the BUS 5-2. The contents registered in the ATM junction table 5b are deleted after Θ seconds. The registered contents of the ATM junction table 5b are deleted because one LEC does not necessarily always communicate with the same LEC. After the step S58, the process returns to the step S52, so as to confirm the ATM junction table 5b.

On the other hand, if the decision result in the step S54 is NO, a step S59 checks whether or not the destination of the received data is the ELAN 101 to which the BUS 5-1 belongs. If the decision result in the step S59 is YES, a step S60 broadcasts the received data to all LECs within the ELAN 101. On the other hand, if the decision result in the step S59 is NO, a step S61 transfers the received data to another BUS, namely, the BUS 5-2 in this case.

(3-3) Connection to External Network:

In this embodiment, the BUS is provided with a function of connecting the LEC to a network gateway (router) if the LEC is to be connected to an external network such as the Internet. It is assumed for the sake of convenience that the LEC 1A-1 sends to the BUS 5-1 an IP ARP request with respect to a terminal in the external network. In this case, the BUS 5-1 assembles the IP ARP request into packets according to the procedure described above, and confirms the IP address table 5a. However, since the terminal to which the LEC 1A-1 wishes to communicate is located within the external network, the IP address in this case is not registered in the IP address table 5a.

In this state, the BUS 5-1 judges that the destination of the IP ARP request from the LEC 1A-1 is the router, and makes a registration in the ATM junction table 5b. FIG. 23 is a diagram for explaining the construction of the ATM junction table 5b of the BUS 5-1 in this case. As shown in FIG. 23, the ATM address of the LEC is "xxxxxLEC1", the ATM address of the BUS is "xxxxxROUT", and it may be seen that the destination router is registered, where LEC1 refers to the LEC 1A-1 and ROUT refers to the router. In this case, the connection up to the router is made according to the LANE protocol. As a result, the LEC 1A-1 can know the MAC address of the router, and a communication with a terminal in the external network via the router is guaranteed.

Figure 24:
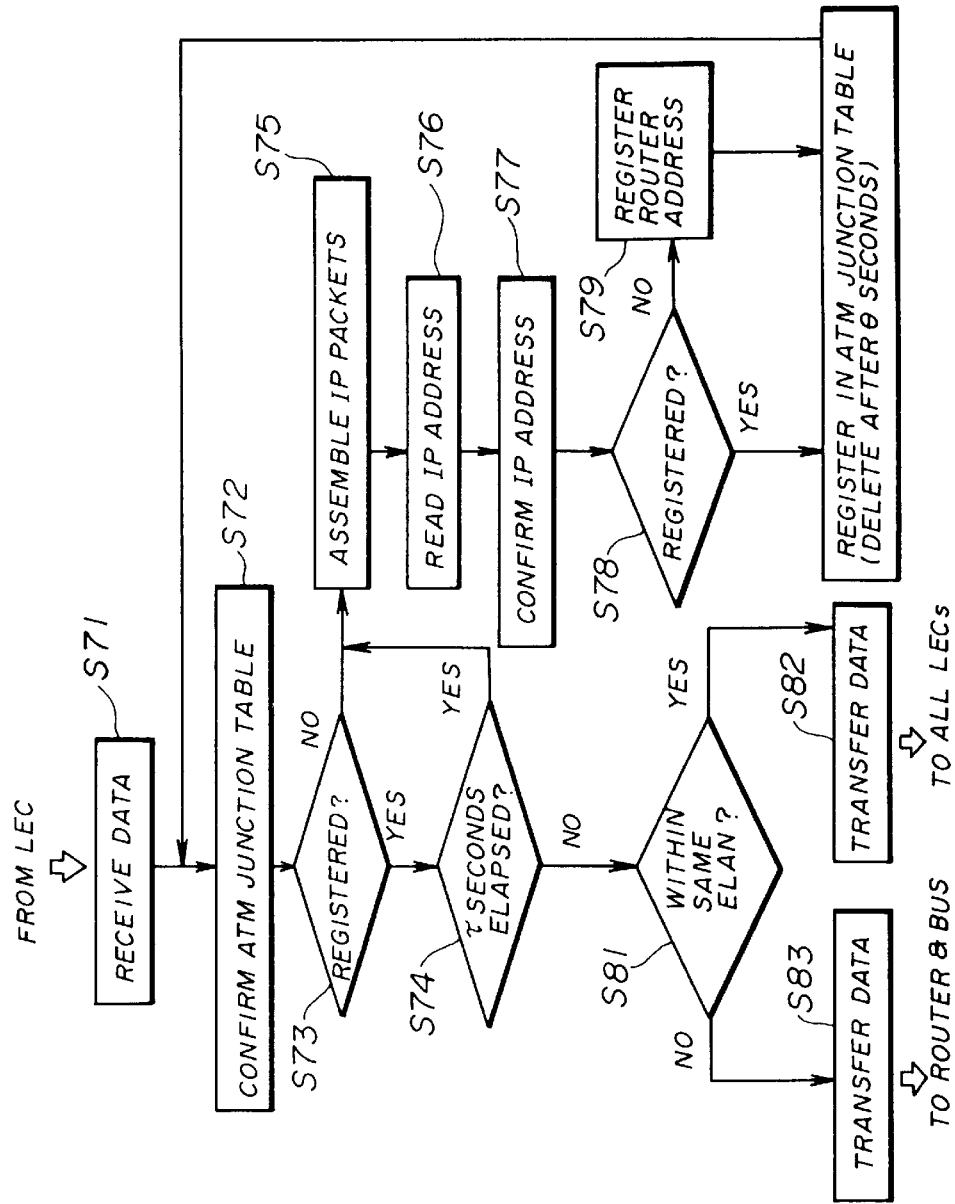
FIG. 24 is a flow chart for explaining the operation of the BUS when making a connection to an external network.

FIG. 24 is a flow chart for explaining the operation of the BUS when making a connection to the external network. The operation shown in FIG. 24 is similar to that shown in FIG. 22, except that in FIG. 24, a sequence is provided to indicate whether or not a registration has been made after confirming the IP address table 5a.

In FIG. 24, when a step S71 receives the data from the LEC 1A-1, a step S72 confirms the ATM junction table 5b of the BUS 5-1. A step S73 checks whether or not the LEC 1A-1 is registered in the ATM junction table 5b. If the decision result in the step S73 is YES, a step S74 checks whether or not a time of τ seconds have elapsed from the time of registration. If the decision result in the step S74 is YES, a step S75 once assembles the received data into IP packets. A step S76 reads the network address portion of the IP address, and a step S77 refers to the IP address table 5a of the BUS 5-1 and confirms that the destination of the data received from the LEC 1A-1 is the ELAN 102.

Then, a step S78 checks whether or not the IP address is registered in the IP address table 5a. If the decision result in the step S78 is NO, it is judged that the connection is to be made with an external network, and a step S79 registers the router address in the ATM junction table 5b. On the other hand, if the decision result in the step S78 is YES, after confirming that the destination of the data received from the LEC 1A-1 is the ELAN 102, a step S80 makes a registration in the ATM junction table 5b of the BUS 5-1 so as to relate the multicast send VCC which connects the BUS 5-1 and the LEC 1A-1 and the VCC for inter-BUS data transfer which connects the BUS 5-1 and the BUS 5-2. The contents registered in the ATM junction table 5b are deleted after Θ seconds. The registered contents of the ATM junction table 5b are deleted because one LEC does not necessarily always communicate with the same LEC. After the step S80, the process returns to the step S72, so as to confirm the ATM junction table 5b. This step S80 is also carried out after the step S79.

On the other hand, if the decision result in the step S74 is NO, a step S81 checks whether or not the destination of the received data is the ELAN 101 to which the BUS 5-1 belongs. If the decision result in the step S81 is YES, a step S82 broadcasts the received data to all LECs within the ELAN 101. On the other hand, if the decision result in the step S81 is NO, a step S83 transfers the received data to another BUS, namely, the BUS 5-2 in this case.

Figure 25:
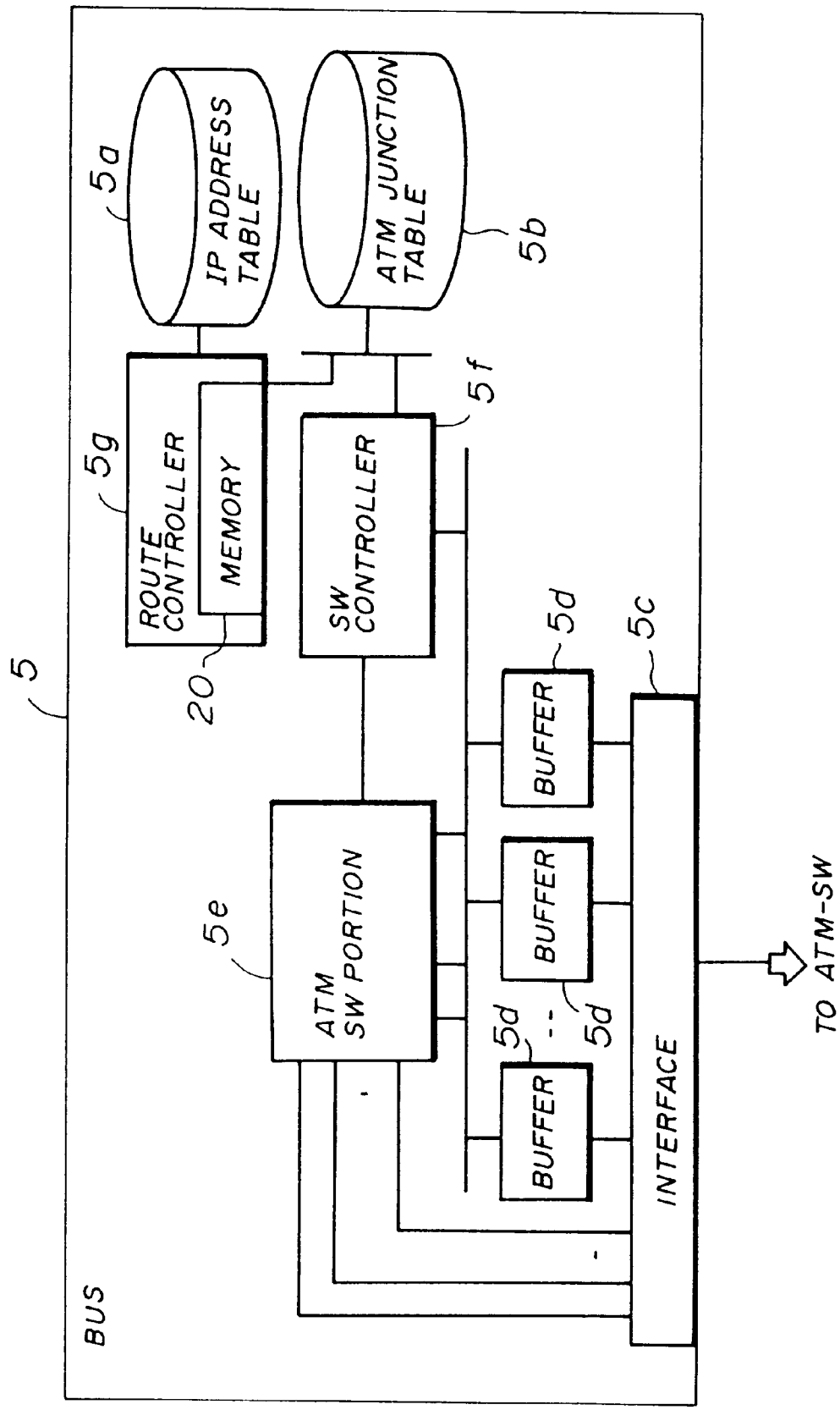
FIG. 25 is a system block diagram showing the construction of the BUS.

FIG. 25 is a system block diagram showing the construction of the BUS. In FIG. 25, those parts which are the same as those corresponding parts in FIG. 16 are designated by the same reference numerals, and a description thereof will be omitted.

As shown in FIG. 25, the BUS 5 includes the IP address table 5a, the ATM junction table 5b, a line interface 5c which connects to the ATM switch 2, a buffer 5d which temporarily stores the data received from the LEC, an ATM switch portion 5e, a switch controller 5f which controls the ATM switch portion 5e, and a route controller 5g. The route controller 5g is coupled to the IP address table 5a, and finds a route. A memory 20 is provided within the route controller 5g.

When the line interface 5c of the BUS 5 receives the data from the LEC, the received data is temporarily stored in the buffer 5d. The route controller 5g once assembles the received data into IP packets. Then, the route controller 5g reads the network address portion of the IP address, and makes a reference to the IP address table 5a so as to recognize the destination of the data received from the LEC.

The router controller 5g which recognizes that the destination of the data received from the LEC is an ELAN other than the ELAN to which the LEC belongs, registers the ATM address of the BUS in the ATM junction table 5b so as to relate the multicast send VCC which connects the BUS and the LEC and the VCC for inter-BUS data transfer between the BUS and a BUS in the other ELAN. Thereafter, the data from the LEC is switched in the ATM cell form by the ATM switch portion 5e towards the BUS in the other ELAN, under the control of the route controller 5g based on the ATM junction table 5b. In this case, the contents of the ATM junction table 5b are maintained for Θ seconds, and thereafter, the IP packets are assembled again, and the route controller 5g makes a re-registration with respect to the ATM junction table 5b.

Therefore, according to this embodiment, it is possible to connect LECs in different ELANs directly by the VCC, and compared to the conventional LANE protocol, it is possible to realize a high-speed inter-ELAN communication.

The ELAN to which the LEC belongs is determined by the network address such as the IP address, regardless of the physical connections, thereby making it possible to realize a flexible network structure. For example, it is possible to easily and physically move the terminal (LEC) without changing the IP address. Further, even when not physically moving the terminal, it is possible to make the terminal belong to a different ELAN by changing the IP address and making the set-up again in the LECs.

When changing all of the IP addresses of a certain group by improving the network numbering plan, the conventional router network required all terminals of the certain group to be stopped and switched at the same time. However, according to the present invention, the IP address is not determined by the physical position of the terminal, and thus, it is possible to move one terminal at a time without the need to stop the operation of all terminals within the certain group.

In addition, the VCC for inter-BUS data transfer is managed by a network manager, that is, the VCC is acquired between a BUS and another BUS(A). But by managing information such as not acquiring the VCC between the BUS and a BUS(B) of a group which is unrelated to the work of the BUS, and not acquiring the VCC between the BUS and a BUS(C) of a group which treats important or secret information, it becomes possible to secure network security.

Further, the present invention is not limited to these embodiments, but various variations and modifications may be made without departing from the scope of the present invention.

What is claimed is:

1. A local area network (LAN) connection method which runs an existing LAN application in an asynchronous transfer mode (ATM) network to connect LANs, said LAN connection method comprising the steps of:
(a) in a LAN emulation (LANE) protocol which operates an existing network in the ATM network, connecting LAN emulation servers (LESs) which mainly cope with addresses from medial access control (MAC) addresses to ATM addresses in emulated LANs (ELANs) by a virtual channel connection (VCC) for transferring a LAN emulation address resolution protocol (LE ARP) which inquires the ATM address from the MAC address; and
(b) transferring a LE ARP request with respect to a LAN emulation client (LEC) in a second ELAN to a LES in the second ELAN when a LES in a first ELAN receives the LE ARP request from a LEC in the first ELAN.

2. The LAN connection method as claimed in claim 1 comprising the steps of:
judging by the LES in the first ELAN that a LEC belongs to the second ELAN if this LEC is not registered in a LEC management table which stores the MAC addresses and the corresponding ATM addresses of all LECs in the first ELAN, and
registering and managing by the LES in the first ELAN information indicating that a response is waited with respect to the LE ARP request using a LE ARP response table which stores the LEC which issued the request and a corresponding responding LEC which responds.

3. The LAN connection method as claimed in claim 1, wherein the LES which receives the transferred LE ARP request
refers to the LEC management table of the second ELAN,
return a LE ARP response to the LES at a request transfer source if the responding LEC is registered in the LEC management table of the second ELAN, and
discarding the LE ARP request if the responding LEC is not registered in the LEC management table of the second ELAN.

4. The LAN connection method as claimed in claim 1, wherein the LES which receives the LE ARP response from another LES
refers to the LE ARP response table of the first ELAN,
transfers the LE ARP response to the LEC which issued the request if this LEC is registered in the LE ARP response table and deletes this LEC from the LE ARP response table, and
discard the LE ARP response if the LEC which issued the request is not registered in the LE ARP response table.

5. A local area network (LAN) connection method which runs a LAN application in an asynchronous transfer mode (ATM) network to connect LANs, said LAN connection method comprising the steps of:
(a) in a LAN emulation (LANE) protocol which operates a network in the ATM network, connecting broadcast and unknown servers (BUSs) which broadcast data from a LAN emulation client (LEC) of an emulated LAN (ELAN) within said ELAN by a virtual channel connection (VCC) for transferring the data between the BUSs; and
(b) transferring data received by the BUS in a first ELAN to the BUS in a second ELAN when said received data relates to a LEC in the second ELAN and is received from a LEC in the first ELAN.

6. The LAN connection method as claimed in claim 5, wherein the BUS in the second ELAN broadcasts the data transferred via the VCC for transferring the data between the BUSs to all LECs within the second ELAN.

7. The LAN connection method as claimed in claim 5, wherein:
when the BUS receives the data from the LEC, the BUS confirms an ATM address of the BUS at a transfer destination by referring to an ATM junction table which stores the ATM address of the LEC and an ATM address of a corresponding BUS, and transfer the data to the BUS at the transfer destination, and
when the BUS refers to the ATM junction table and confirms that the transfer destination is itself, the BUS broadcasts the data to all LECs within the ELAN to which the BUS belongs.

8. The LAN connection method as claimed in claim 7, wherein if the LEC is not registered in the ATM junction table, the LAN connection method comprises assembling the received data into IP packets from ATM cells, judging the BUS at the transfer destination from a destination IP address of an IP packet, and registering LEC in the ATM junction table using the destination IP address of the BUS at the transfer destination.

9. The LAN connection method as claimed in claim 5, wherein in order to judge the BUS at a transfer destination from an IP address of the received data, an IP address table is registered in each BUS, and the IP address table stores a correspondence of the IP address and a name of the ELAN or an ATM address of the BUS.

10. The LAN connection method as claimed in claim 5, which further comprises the steps of:

(c) deleting the LEC which is registered in the ATM junction table after a predetermined time of Θ seconds elapses from the registration thereof.

11. The LAN connection method as claimed in claim 8, which further comprises the steps of:

(c) carrying out a registration process with respect to the ATM junction table if the data is received from the LEC that is registered in the ATM junction table after a time of τ seconds elapses.

12. The LAN connection method as claimed in claim 10, which further comprises the steps of:

(d) carrying out a registration process with respect to the ATM junction table if the data is received from the LEC that is registered in the ATM junction table after a time of τ seconds elapses, where τ<Θ.

13. The LAN connection method as claimed in claim 9, which further comprises the steps of:

(c) if a registration is made in the ATM junction table with respect to a packet at a destination address which is not registered in the IP address table, registering the transfer destination in the ATM junction table as a gateway (router) to an external network, so that a communication with the external network is guaranteed.

14. A local area network (LAN) connection method which runs a LAN application in an asynchronous transfer mode (ATM) network to connect LANs, said LAN connection method comprising the steps of:

(a) managing, in a LAN emulation configuration server (LECS) which has a function of linking a LAN emulation client (LEC) to a specific emulated LAN (ELAN), a corresponding table of a network address of an IP address and an ATM address of each LAN emulation server (LES) which handles addresses from a media access control (MAC) addresses to ATM addresses;

(b) judging from the IP address the LES to which the LEC is to be connected, where the LEC acquires a configuration direct virtual channel connection (VCC) which is an initial setting VCC with respect to the LECS; and (c) notifying the ATM address of the LES to the LEC.

15. A local area network (LAN) connection method which runs a LAN application in an asynchronous transfer mode (ATM) network to connect LANs, said LAN connection method comprising the steps of:

(a) in a LAN emulation (LANE) protocol which operates a network in the ATM network, connecting LAN emulation servers (LESs) in emulated LANs (ELANs) by a virtual channel connection (VCC) for transferring a LAN emulation address resolution protocol (LE ARP); and (b) transferring a LE ARP request with respect to a LAN emulation client (LEC) in a second ELAN to a LES in the second ELAN when a LES in a first ELAN receives the LE ARP request from a LEC in the first ELAN.

16. A local area network (LAN) connection method which runs a LAN application in an asynchronous transfer mode (ATM) network to connect LANs, said LAN connection method comprising the steps of:

(a) managing, in a LAN emulation configuration server (LECS) which has a function of linking a LAN emulation client (LEC) to a specific emulated LAN (ELAN), a corresponding table of a network address of a network layer address and an ATM address of each LAN emulation server (LES);

(b) judging from the network address the LES to which the LEC is to be connected, where the LEC acquires a configuration direct virtual channel connection (VCC); and (c) notifying the ATM address of the LES to the LEC.

* * * * *